United States Patent
Hagimori

(10) Patent No.: US 6,515,805 B2
(45) Date of Patent: Feb. 4, 2003

(54) TAKING LENS DEVICE

(75) Inventor: Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 64 days.

(21) Appl. No.: 09/891,993

(22) Filed: Jun. 26, 2001

(65) Prior Publication Data

US 2002/0024746 A1 Feb. 28, 2002

(30) Foreign Application Priority Data

Jul. 3, 2000 (JP) .......................................... 2000-200591
Dec. 4, 2000 (JP) .......................................... 2000-368342

(51) Int. Cl.[7] .............................................. G02B 15/14
(52) U.S. Cl. ........................ 359/691; 359/680; 359/682
(58) Field of Search ................................. 359/682, 680, 359/691

(56) References Cited

U.S. PATENT DOCUMENTS

| | | | | |
|---|---|---|---|---|
| 5,381,269 A | * | 1/1995 | Estelle | 359/691 |
| 5,552,936 A | * | 9/1996 | Ohno | 359/691 |
| 6,359,738 B1 | * | 3/2002 | Nakamura et al. | 359/691 |
| 2002/0024746 A1 | * | 2/2002 | Hagimori | 359/691 |

FOREIGN PATENT DOCUMENTS

| | | |
|---|---|---|
| JP | 01-183617 A | 7/1989 |
| JP | 05-164965 A | 6/1993 |
| JP | 10-232349 A | 9/1998 |
| JP | 11-352397 A | 12/1999 |

\* cited by examiner

*Primary Examiner*—Georgia Epps
*Assistant Examiner*—David N. Spector
(74) *Attorney, Agent, or Firm*—Sidley Austin Brown & Wood LLP

(57) ABSTRACT

A taking lens device has a zoom lens system, including a plurality of lens units, for forming an optical image of an object with variable magnification achieved by varying the distances between the lens units, and an image sensor for converting the optical image formed by the zoom lens system into an electric signal. The zoom lens system includes, from the object side to the image side a first lens unit that has a negative optical power, that is composed solely of a single negative lens element having a sharper curvature on the image side than on the object side thereof, and that is moved along the optical axis during zooming, and a second lens unit that is disposed with an aerial distance secured between itself and the first lens unit, that has a positive optical power, and that is moved along the optical axis during zooming. Moreover, the following conditional formulae are fulfilled: $0.3 < t1/Y' < 1.5$ and $1.4 < |f1/fw| < 5$, where t1 represents the axial thickness (surface-to-surface distance along the optical axis) of the negative lens element constituting the first lens unit, Y' represents the maximum image height shootable, f1 represents the focal length of the first lens unit, and fw represents the focal length of the entire zoom lens system at the wide-angle end.

23 Claims, 13 Drawing Sheets

FNO=3.09

(W)
— d
— — g
— — SC

-0.5　0.5
SPHERICAL SINE
ABERRATION CONDITION

Y'=1.3

— — — DM
——— DS

-0.5　0.5
ASTIGMATISM

Y'=1.3

-10.0　10.0
DISTORTION%

FNO=3.64

(M)
— d
— — g
— — SC

-0.5　0.5
SPHERICAL SINE
ABERRATION CONDITION

Y'=1.3

— — — DM
——— DS

-0.5　0.5
ASTIGMATISM

Y'=1.3

-10.0　10.0
DISTORTION%

FNO=4.18

(T)
— d
— — g
— — SC

-0.5　0.5
SPHERICAL SINE
ABERRATION CONDITION

Y'=1.3

— — — DM
——— DS

-0.5　0.5
ASTIGMATISM

Y'=1.3

-10.0　10.0
DISTORTION%

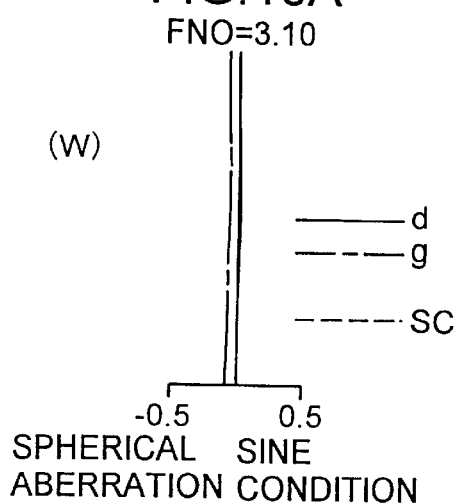
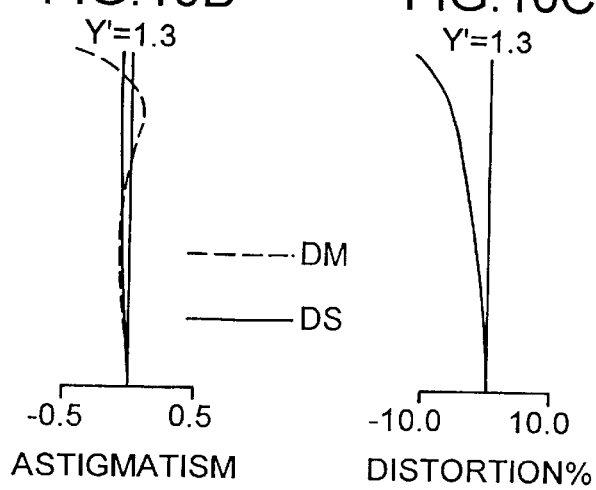
FIG.10A FNO=3.10 (W)
FIG.10B Y'=1.3
FIG.10C Y'=1.3
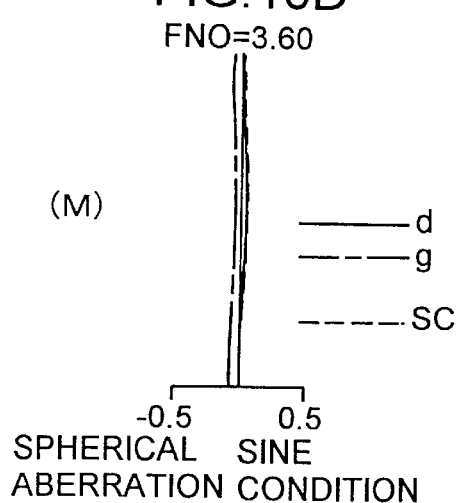
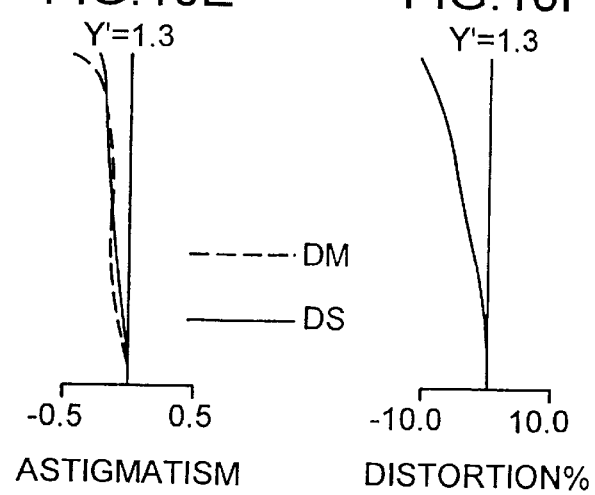
FIG.10D FNO=3.60 (M)
FIG.10E Y'=1.3
FIG.10F Y'=1.3
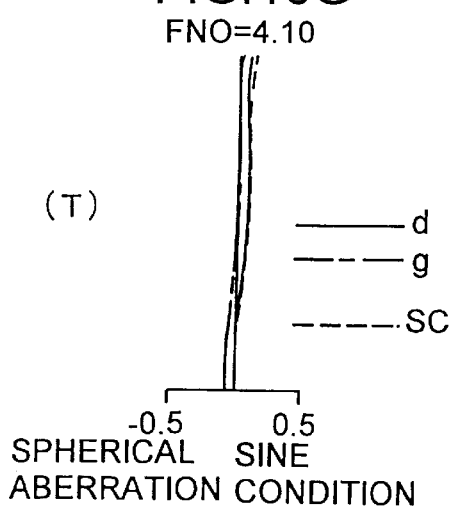
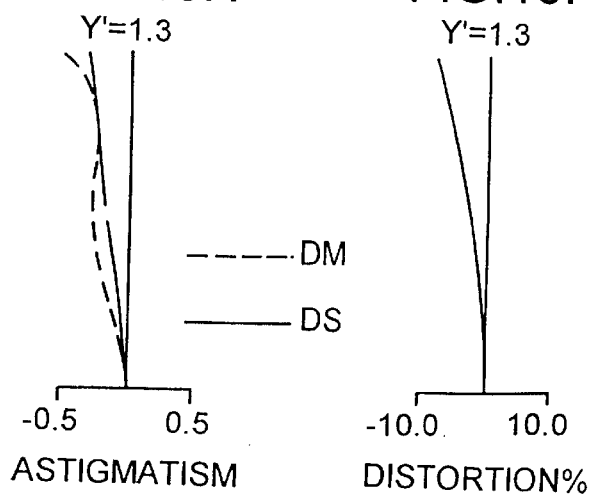
FIG.10G FNO=4.10 (T)
FIG.10H Y'=1.3
FIG.10I Y'=1.3

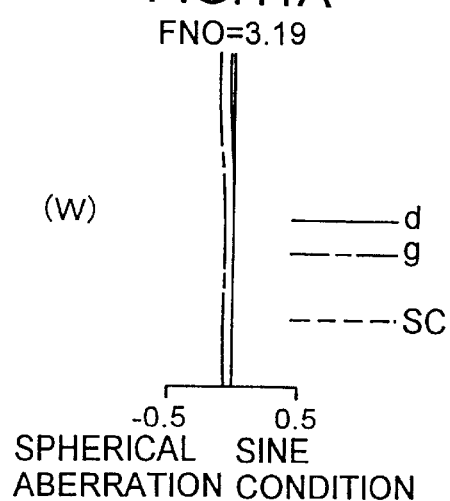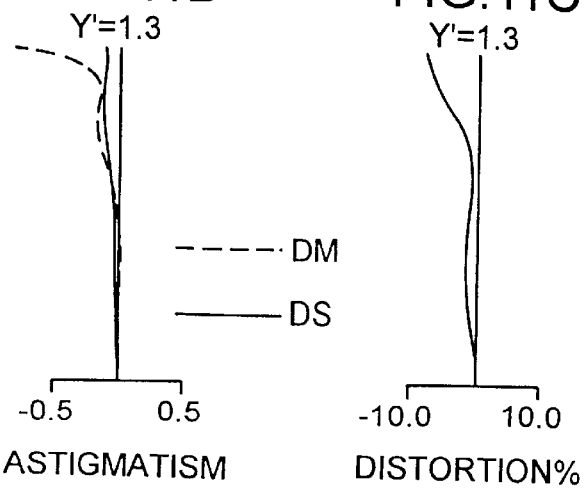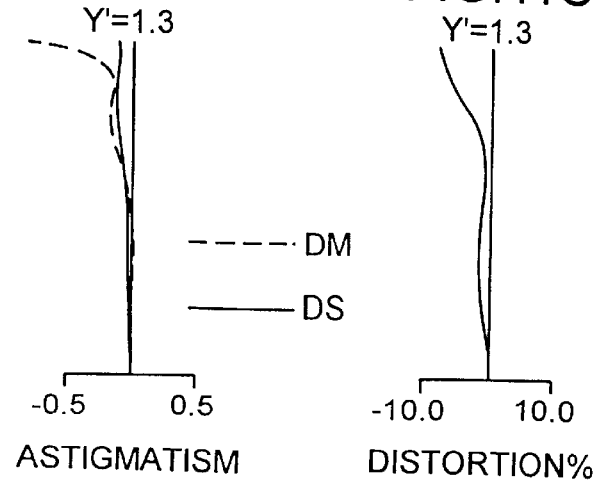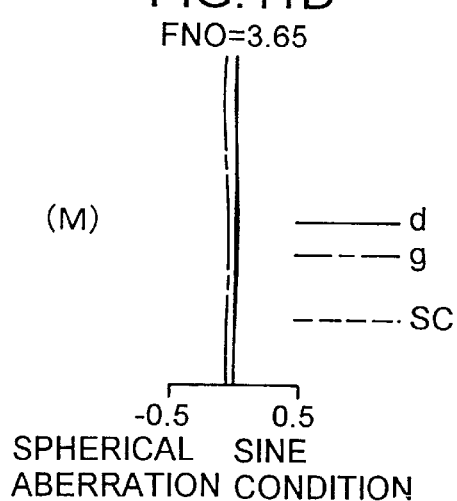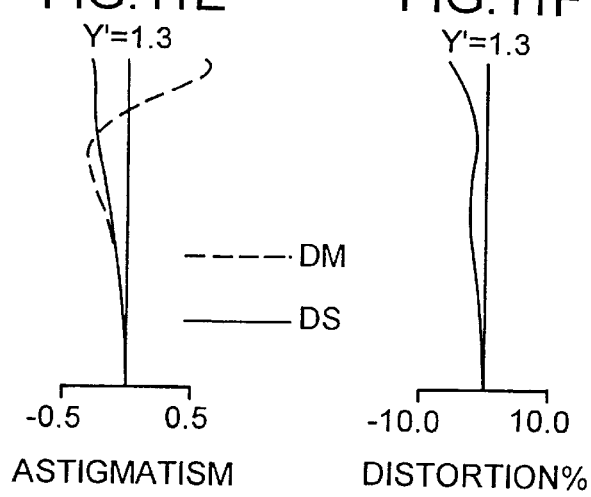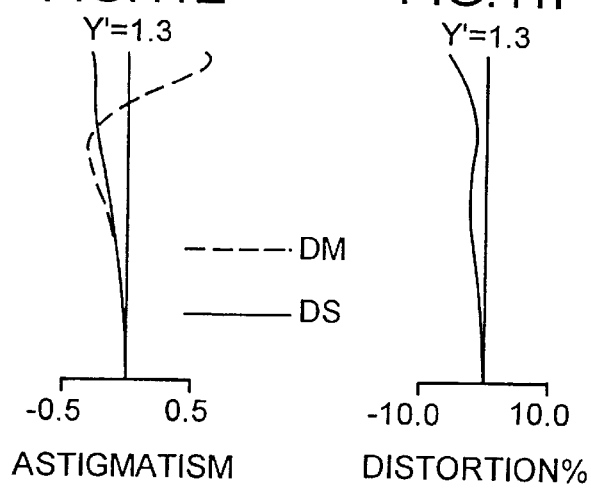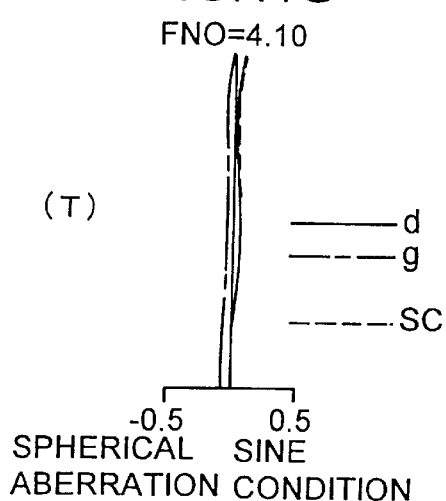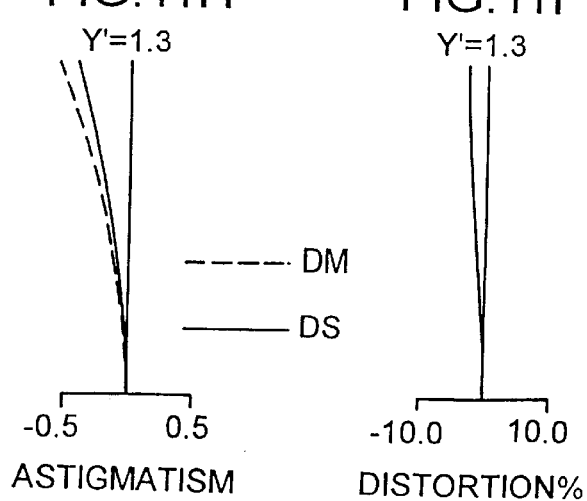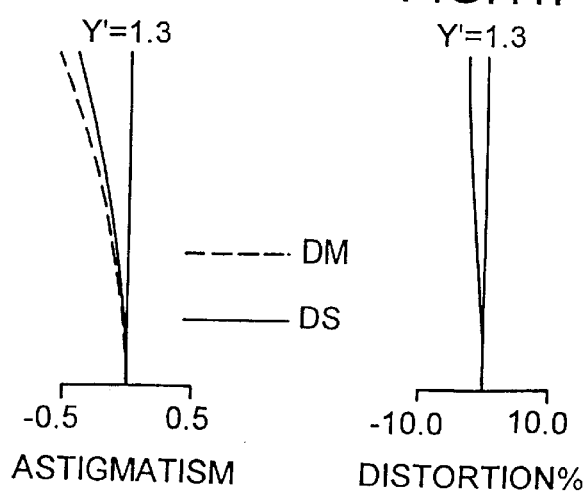

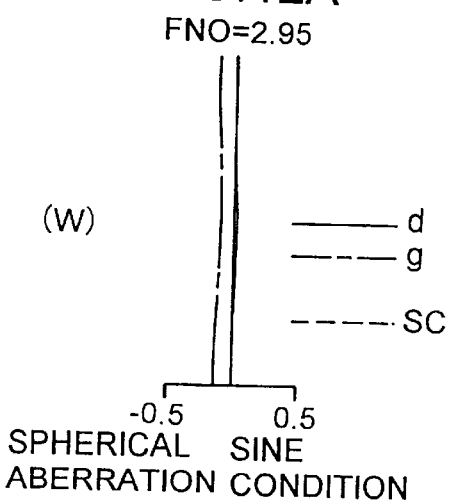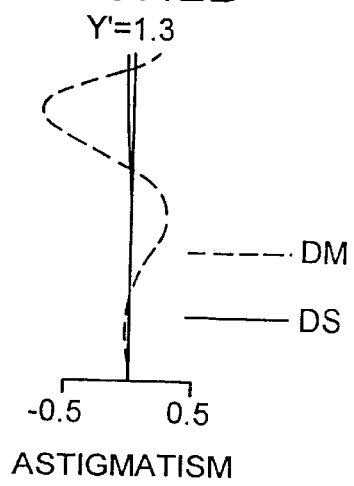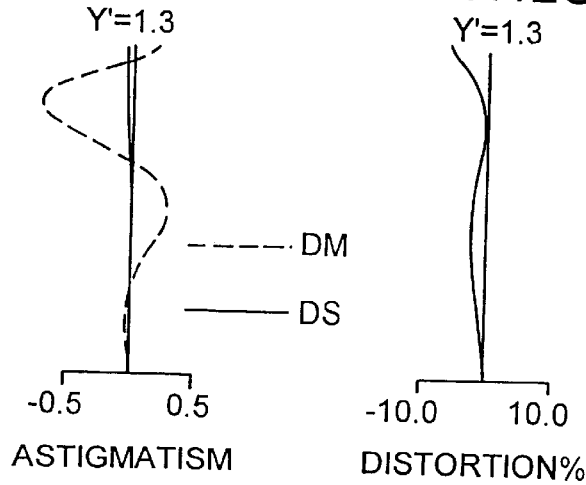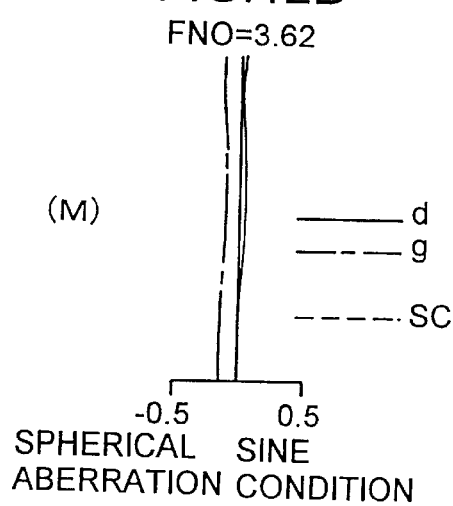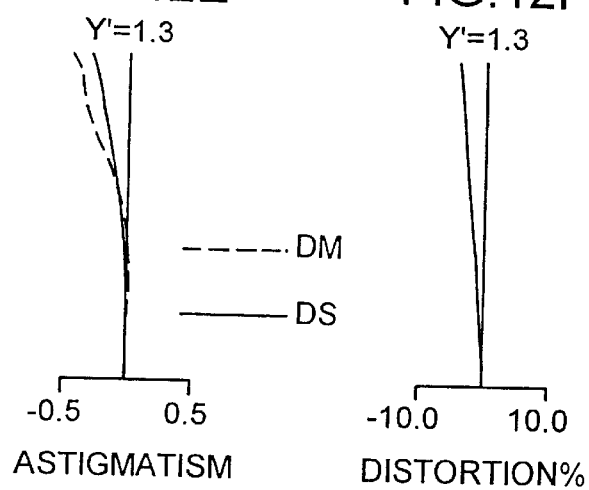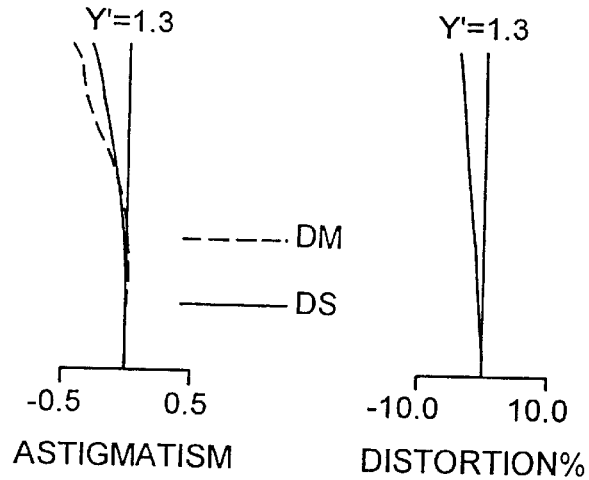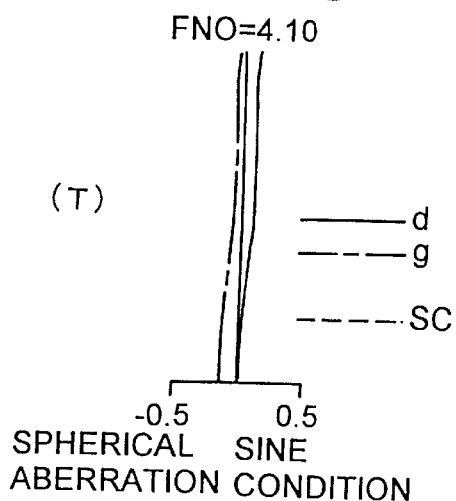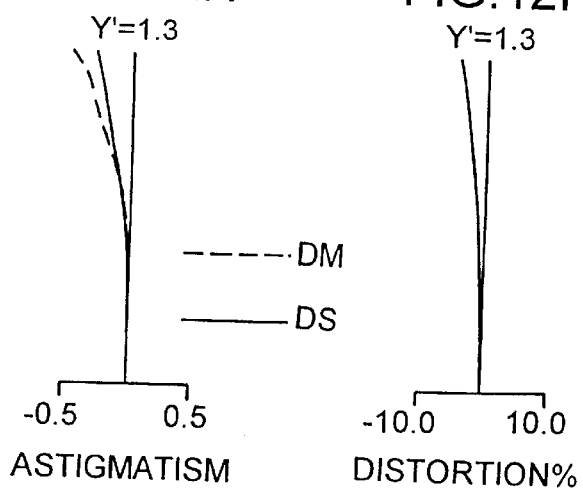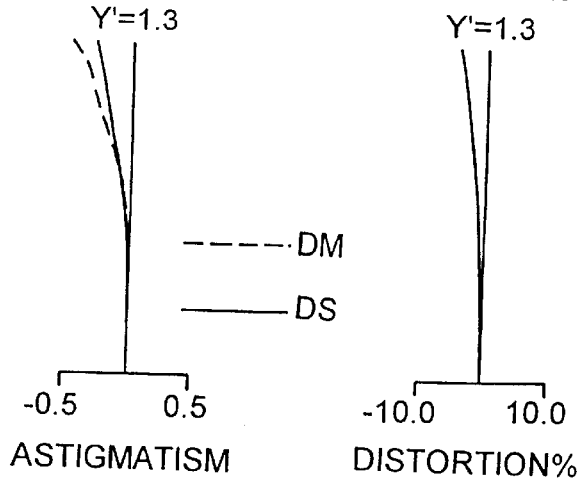

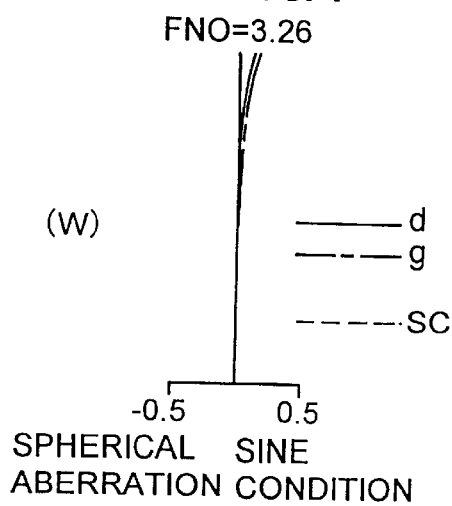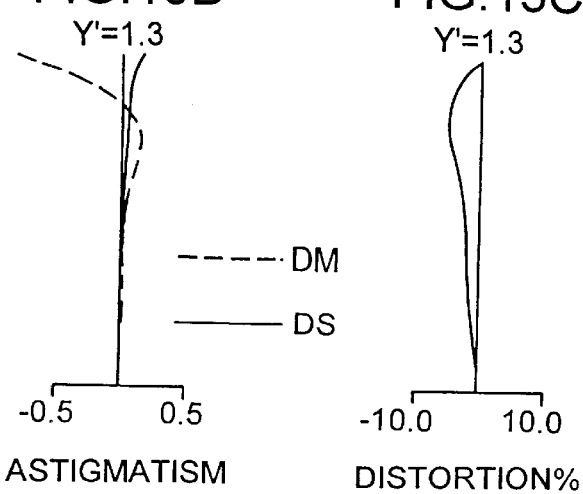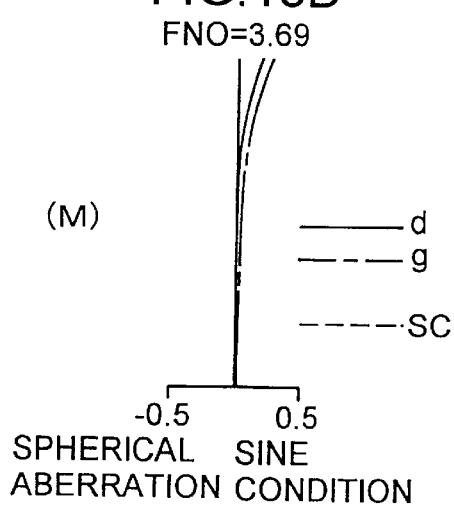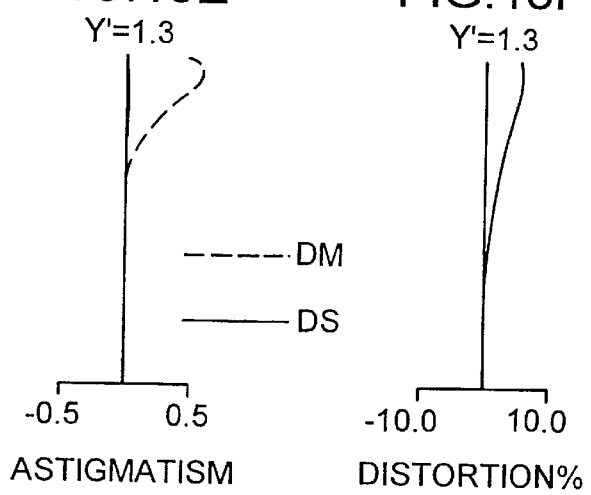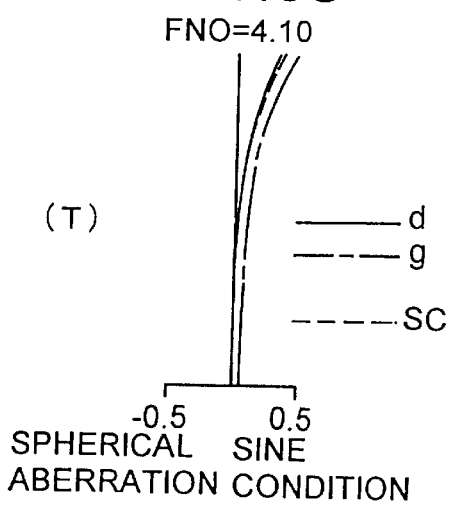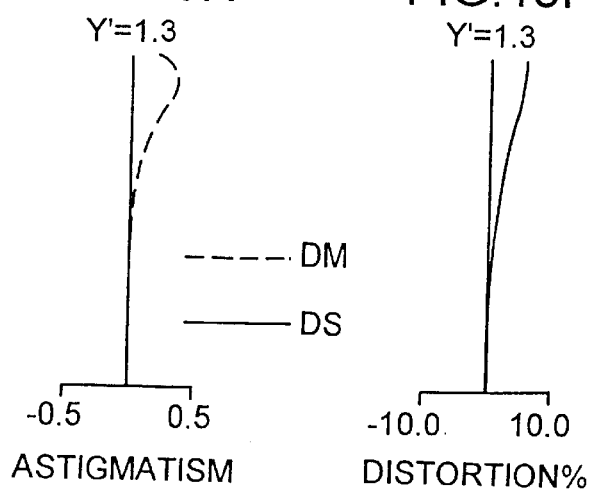

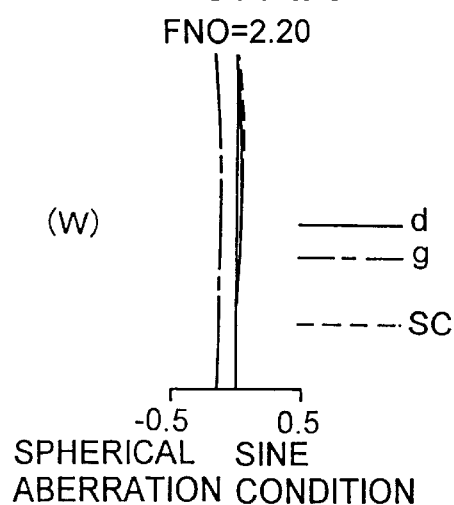
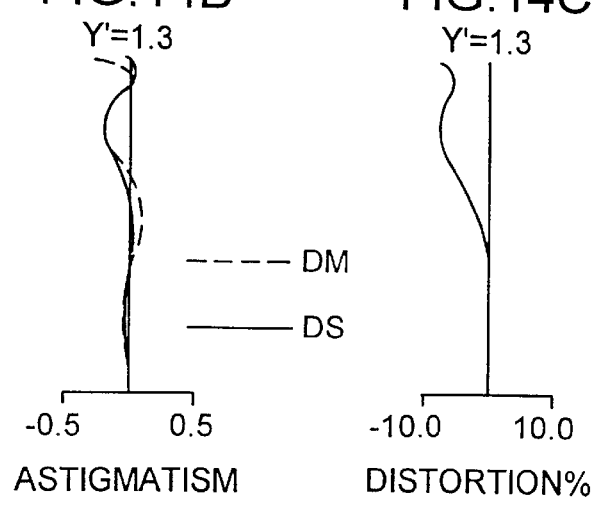
FIG.14A FNO=2.20 (W) — d — — g — — — SC SPHERICAL ABERRATION / SINE CONDITION
FIG.14B Y'=1.3 — — — DM — DS ASTIGMATISM
FIG.14C Y'=1.3 DISTORTION%
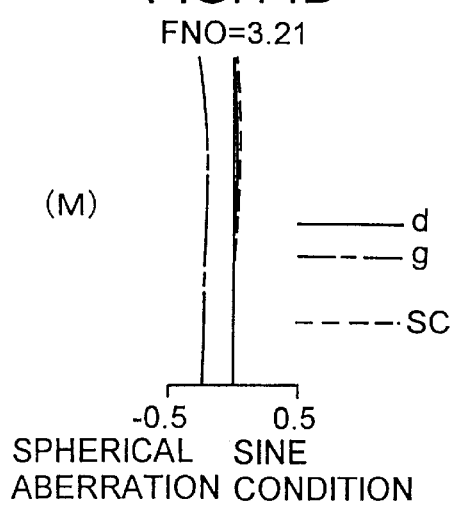
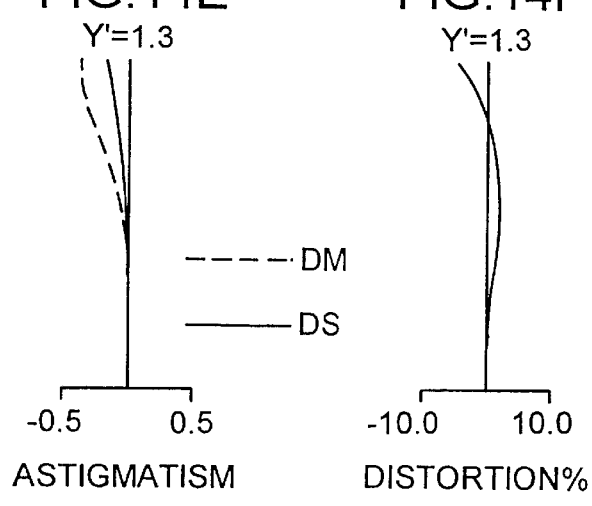
FIG.14D FNO=3.21 (M) — d — — g — — — SC SPHERICAL ABERRATION / SINE CONDITION
FIG.14E Y'=1.3 — — — DM — DS ASTIGMATISM
FIG.14F Y'=1.3 DISTORTION%
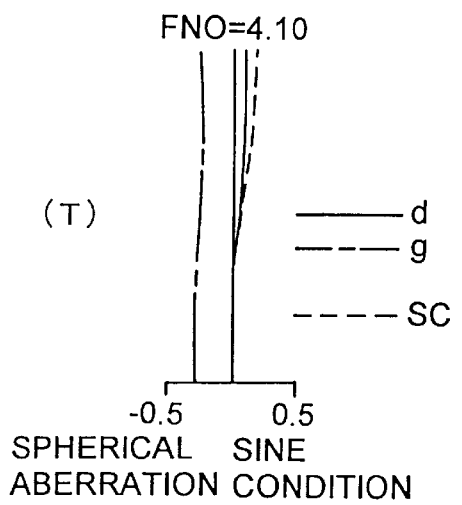
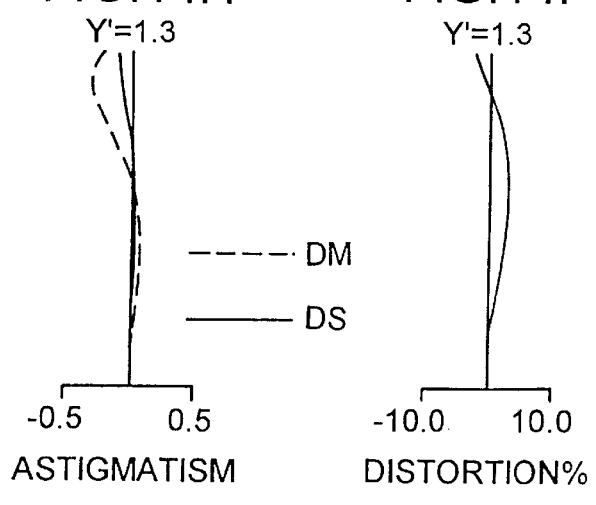
FIG.14G FNO=4.10 (T) — d — — g — — — SC SPHERICAL ABERRATION / SINE CONDITION
FIG.14H Y'=1.3 — — — DM — DS ASTIGMATISM
FIG.14I Y'=1.3 DISTORTION%

FNO=2.29
(W)
— d
— — g
- - - - SC
-0.5   0.5
SPHERICAL SINE
ABERRATION CONDITION

Y'=0.7
- - - - DM
—— DS
-0.5   0.5
ASTIGMATISM

Y'=0.7
-10.0   10.0
DISTORTION%

FNO=3.25
(M)
— d
— — g
- - - - SC
-0.5   0.5
SPHERICAL SINE
ABERRATION CONDITION

Y'=0.7
- - - - DM
—— DS
-0.5   0.5
ASTIGMATISM

Y'=0.7
-10.0   10.0
DISTORTION%

FNO=4.10
(T)
— d
— — g
- - - - SC
-0.5   0.5
SPHERICAL SINE
ABERRATION CONDITION

Y'=0.7
- - - - DM
—— DS
-0.5   0.5
ASTIGMATISM

Y'=0.7
-10.0   10.0
DISTORTION%

FIG.16A
FNO=3.00
(W)
— d
— — g
— — — SC
-0.5  0.5
SPHERICAL SINE
ABERRATION CONDITION
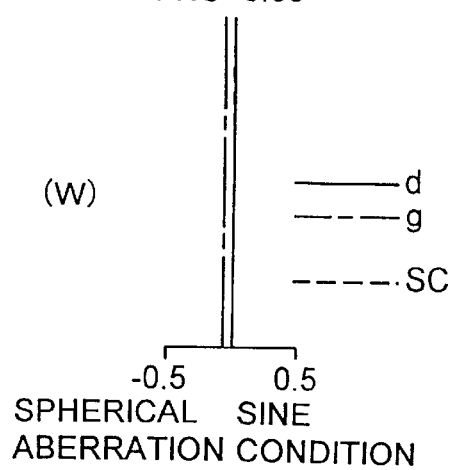
FIG.16B
Y'=1.3
— — — DM
——— DS
-0.5  0.5
ASTIGMATISM
FIG.16C
Y'=1.3
-10.0  10.0
DISTORTION%
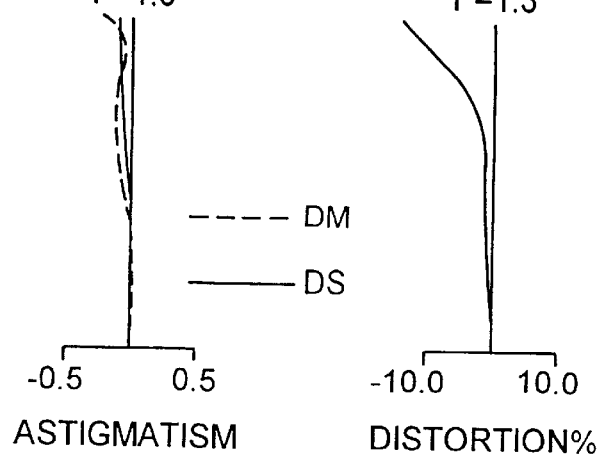
FIG.16D
FNO=3.60
(M)
— d
— — g
— — — SC
-0.5  0.5
SPHERICAL SINE
ABERRATION CONDITION
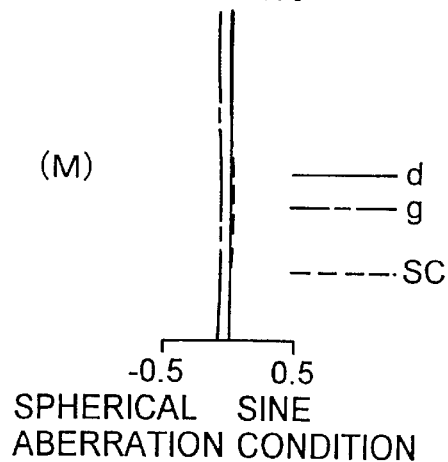
FIG.16E
Y'=1.3
— — — DM
——— DS
-0.5  0.5
ASTIGMATISM
FIG.16F
Y'=1.3
-10.0  10.0
DISTORTION%
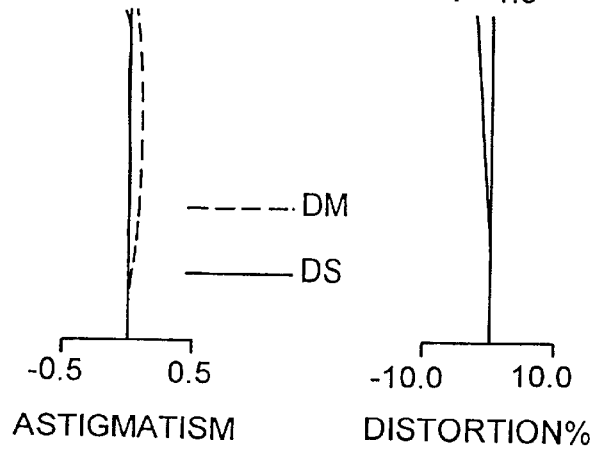
FIG.16G
FNO=4.10
(T)
— d
— — g
— — — SC
-0.5  0.5
SPHERICAL SINE
ABERRATION CONDITION
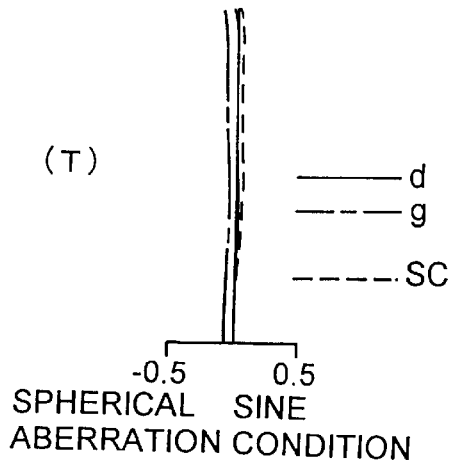
FIG.16H
Y'=1.3
— — — DM
——— DS
-0.5  0.5
ASTIGMATISM
FIG.16I
Y'=1.3
-10.0  10.0
DISTORTION%
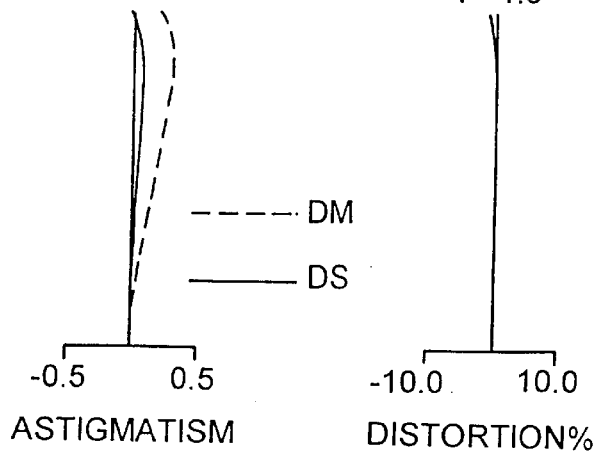

TAKING LENS DEVICE

This application is based on Japanese Patent Applications Nos. 2000-200591 and 2000-368342 filed respectively on Jul. 3, 2000 and Dec. 4, 2000, the contents of which are hereby incorporated by reference.

BACKGROUND OF THE INVENTION

1. Field of the Invention

The present invention relates to a taking lens device. More specifically, the present invention relates to a taking lens device that optically takes in an image of a subject through an optical system and that then outputs the image as an electric signal by means of an image sensor, for example a taking lens device that is used as a main component of a digital camera, a video camera, or a camera that is incorporated in or externally fitted to a device such as a digital video unit, a personal computer, a mobile computer, a portable telephone, or a personal digital assistant (PDA). The present invention relates particularly to a taking lens device provided with a compact zoom lens system.

2. Description of the Prior Art

In recent years, with the explosive spread of portable information terminals called PDAs and portable telephones, an increasing number of models have been coming to incorporate a compact digital camera or digital video unit employing a CCD (charge-coupled device) or CMOS (complementary metal-oxide semiconductor) sensor as an image sensor. When such a digital camera or the like is miniaturized using an image sensor with a relatively small effective image-sensing surface area, its optical system also needs to be miniaturized accordingly. As a compact zoom lens with a small number of lens elements for use in a digital camera or the like provided with an image sensor with a small effective area, Japanese Patent Application Laid-Open No. H1-183617 proposes a zoom lens of a so-called negative-positive two-unit type composed of, from the object side, a first lens unit having a negative optical power and a second lens unit having a positive optical power. Zoom lenses of this type include a minimum number of movable lens units and have simple mechanical structures, and are therefore suitable as low-cost zoom lenses. On the other hand, Japanese Patent Applications Laid-Open Nos. H5-164965, H 1-352397, H10-232349, and other applications propose zoom lenses of the same optical type that include fewer lens elements.

In the zoom lens proposed in Japanese Patent Application Laid-Open No. H1-183617 mentioned above, the second lens unit is composed of three lens elements, namely two positive lens elements and one negative lens element. This makes the optical axis length of the second lens unit too long to make the entire zoom lens satisfactorily compact. In the zoom lens proposed in the Japanese Patent Application Laid-Open No. H5-164965 mentioned above, the first and second lens units are each composed of one lens element; that is, the entire zoom lens includes only two lens elements, the least possible number theoretically. However, this zoom lens offers a zoom ratio lower than 2× and a dark f-number. In the zoom lenses proposed in the Japanese Patent Applications Laid-Open Nos. H11-352397 and H10-232349 mentioned above, the first or second lens unit is stationary. This requires that an image sensor be moved to compensate for the defocusing resulting from zooming.

SUMMARY OF THE INVENTION

An object of the present invention is to provide a taking lens device provided with a zoom lens system that permits cost reduction and miniaturization to be achieved simultaneously and that offers a bright f-number and a zoom ratio of about 2× to 3×.

To achieve the above object, according to one aspect of the present invention, a taking lens device is provided with: a zoom lens system, including a plurality of lens units, for forming an optical image of an object with variable magnification achieved by varying the distances between the lens units; and an image sensor for converting the optical image formed by the zoom lens system into an electric signal. Here, the zoom lens system includes, from the object side to the image side: a first lens unit that has a negative optical power, that is composed solely of a single negative lens element having a sharper curvature on the image side than on the object side thereof, and that is moved along the optical axis during zooming; and a second lens unit that is disposed with an aerial distance secured between itself and the first lens unit, that has a positive optical power, and that is moved along the optical axis during zooming. Moreover, the following conditional formulae (1) and (2) are fulfilled:

$$0.3 < t1/Y' < 1.5 \quad (1)$$

$$1.4 < |f1/fw| < 5 \quad (2)$$

where
- t1 represents the axial thickness (surface-to-surface distance along the optical axis) of the negative lens element constituting the first lens unit;
- Y' represents the maximum image height shootable;
- f1 represents the focal length of the first lens unit; and
- fw represents the focal length of the entire zoom lens system at the wide-angle end.

According to another aspect of the present invention, a taking lens device is provided with: a zoom lens system, including a plurality of lens units, for forming an optical image of an object with variable magnification achieved by varying the distances between the lens units; and an image sensor for converting the optical image formed by the zoom lens system into an electric signal. Here, the zoom lens system includes, from the object side to the image side: a first lens unit that has a negative optical power, that is composed solely of a single negative lens element having a sharper curvature on the image side than on the object side thereof, and that is moved along the optical axis during zooming; and a second lens unit that is disposed with an aerial distance secured between itself and the first lens unit, that has a positive optical power, that includes two lens elements, namely, from the object side, one positive lens element and one positive or negative lens element, and that is moved along the optical axis during zooming.

According to another aspect of the present invention, a taking lens device is provided with: a zoom lens system, including a plurality of lens units, for forming an optical image of an object with variable magnification achieved by varying the distances between the lens units; and an image sensor for converting the optical image formed by the zoom lens system into an electric signal. Here, the zoom lens system includes, from the object side to the image side: a first lens unit that has a negative optical power, that is composed solely of a single negative lens element made of resin and having a sharper curvature on the image side than on the object side thereof, and that is moved along the optical axis during zooming; and a second lens unit that is disposed with an aerial distance secured between itself and the first lens unit, that has a positive optical power, that has a lens element made of resin at the image-side end thereof, and that is moved along the optical axis during zooming.

According to another aspect of the present invention, a taking lens device is provided with: a zoom lens system, including a plurality of lens units, for forming an optical image of an object with variable magnification achieved by varying the distances between the lens units; and an image sensor for converting the optical image formed by the zoom lens system into an electric signal. Here, the zoom lens system includes, from the object side to an image side: a first lens unit that has a negative optical power, that is composed solely of a single negative lens element having a sharper curvature on the image side than on the object side thereof, and that is moved along the optical axis during zooming; and a second lens unit that is disposed with an aerial distance secured between itself and the first lens unit, that has a positive optical power, that is composed solely of a single positive lens element having a sharper curvature on the object side than on the image side thereof, and that is moved along the optical axis during zooming,

BRIEF DESCRIPTION OF THE DRAWINGS

This and other objects and features of the present invention will become clear from the following description, taken in conjunction with the preferred embodiments with reference to the accompanying drawings in which:

FIGS. 10A to 10I are aberration diagrams of Example 2;

FIGS. 11A to 11I are aberration diagrams of Example 3;

FIGS. 12A to 12I are aberration diagrams of Example 4;

FIGS. 13A to 13I are aberration diagrams of Example 5;

FIGS. 14A to 14I are aberration diagrams of Example 6;

FIGS. 16A to 16I are aberration diagrams of Example 8; and

DESCRIPTION OF THE PREFERRED EMBODIMENTS

Figure 1:
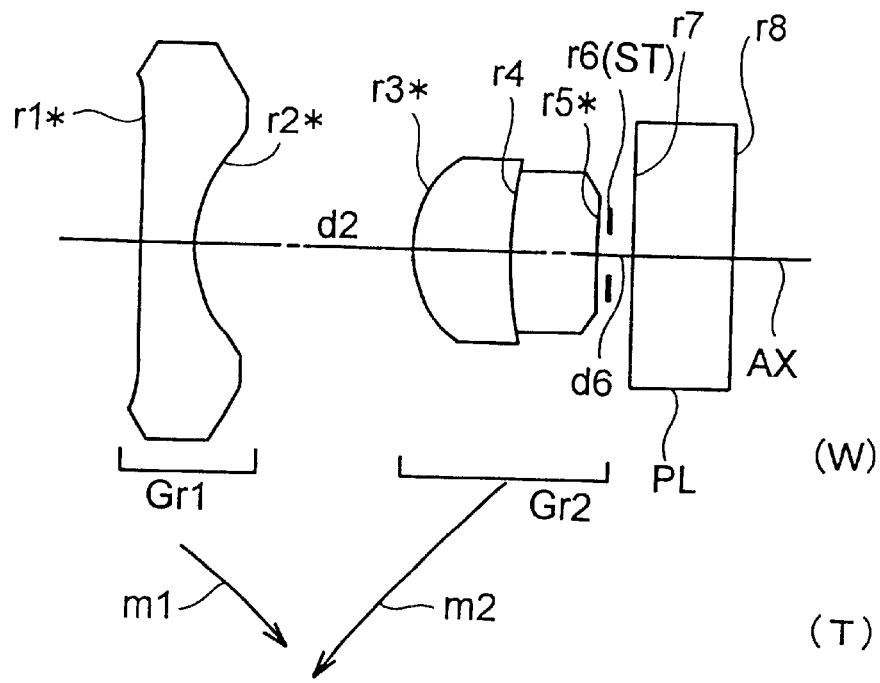
FIG. 1 is a lens arrangement diagram of a first embodiment (Example 1) of the invention.
Figure 2:
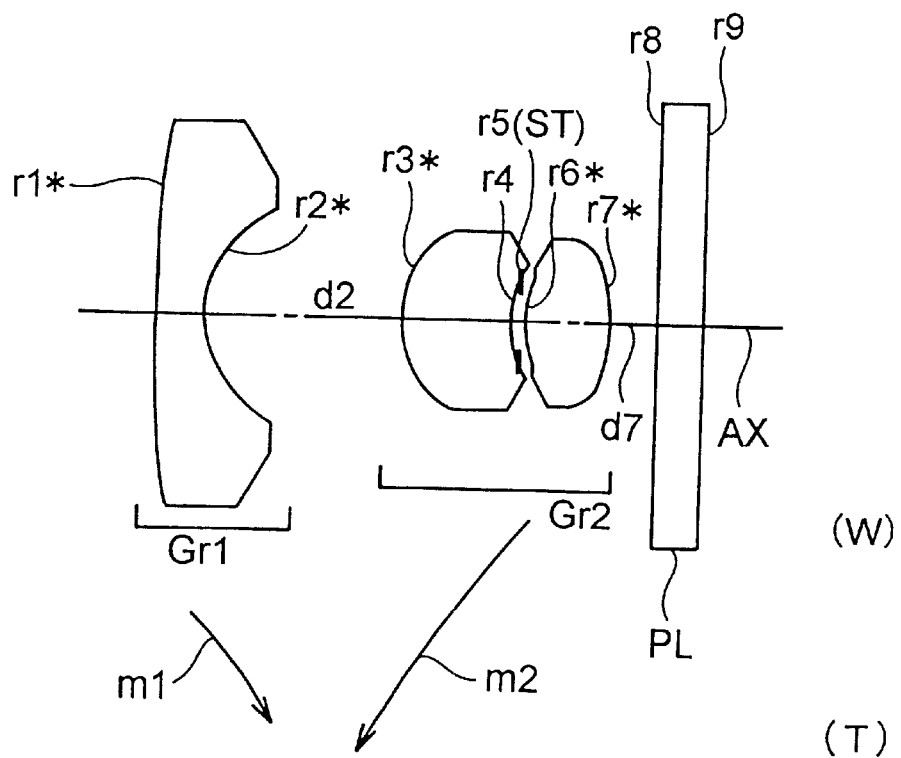
FIG. 2 is a lens arrangement diagram of a second embodiment (Example 2) of the invention.
Figure 3:
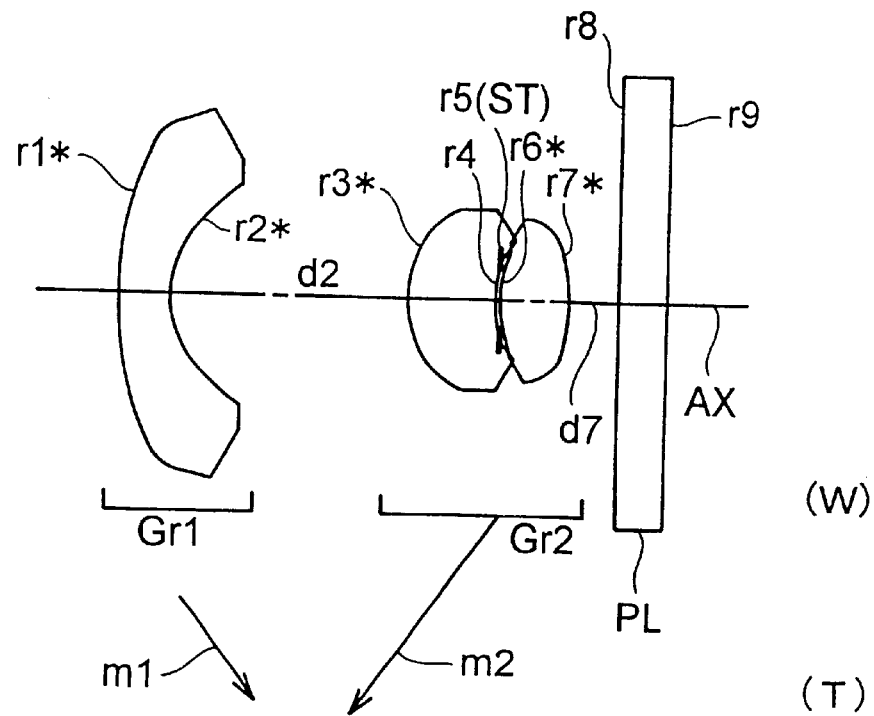
FIG. 3 is a lens arrangement diagram of a third embodiment (Example 3) of the invention.
Figure 4:
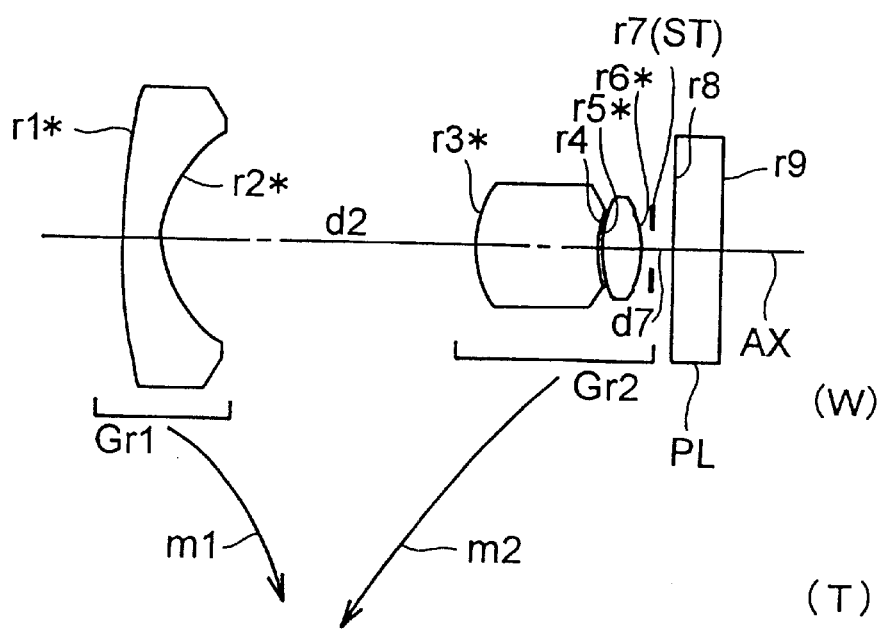
FIG. 4 is a lens arrangement diagram of a fourth embodiment (Example 4) of the invention.
Figure 5:
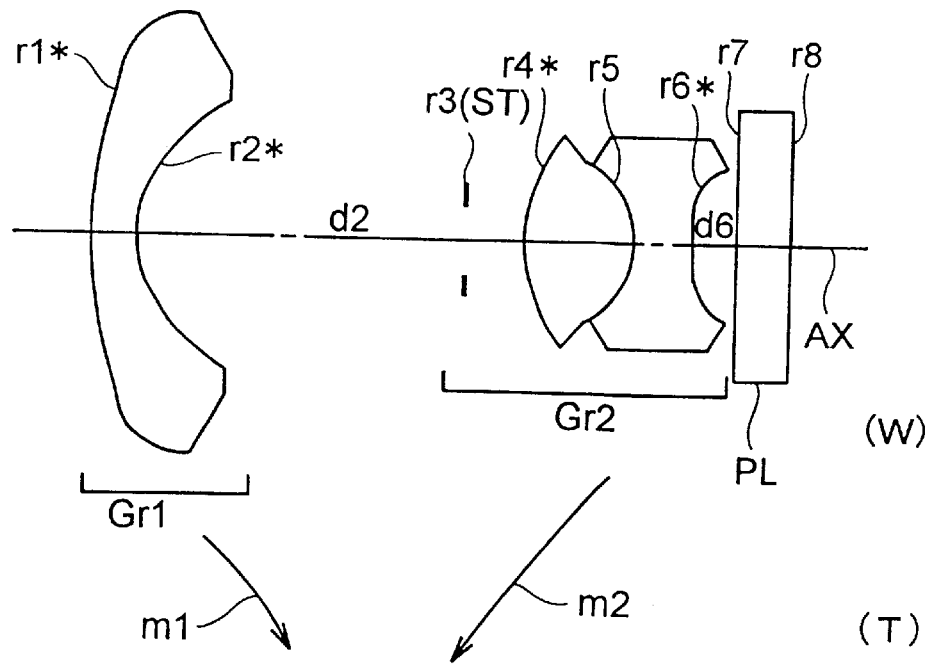
FIG. 5 is a lens arrangement diagram of a fifth embodiment (Example 5) of the invention.
Figure 6:
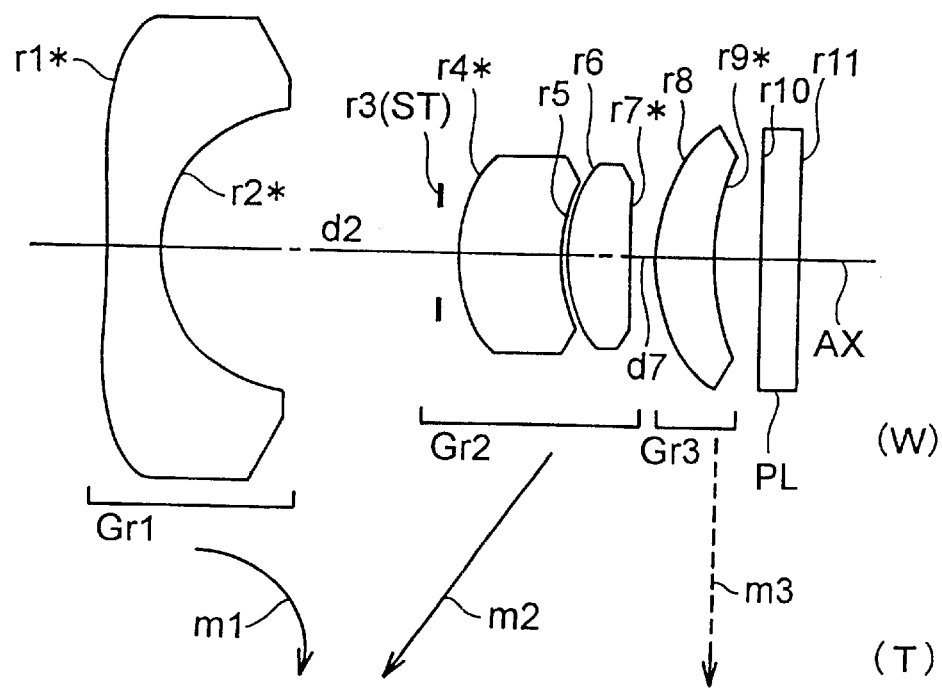
FIG. 6 is a lens arrangement diagram of a sixth embodiment (Example 6) of the invention.
Figure 7:
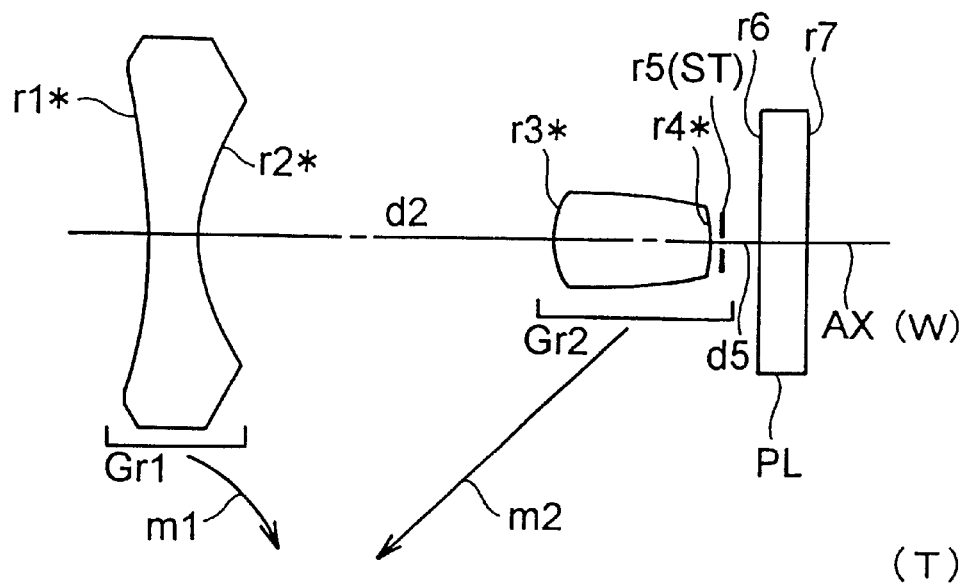
FIG. 7 is a lens arrangement diagram of a seventh embodiment (Example 7) of the invention.
Figure 8:
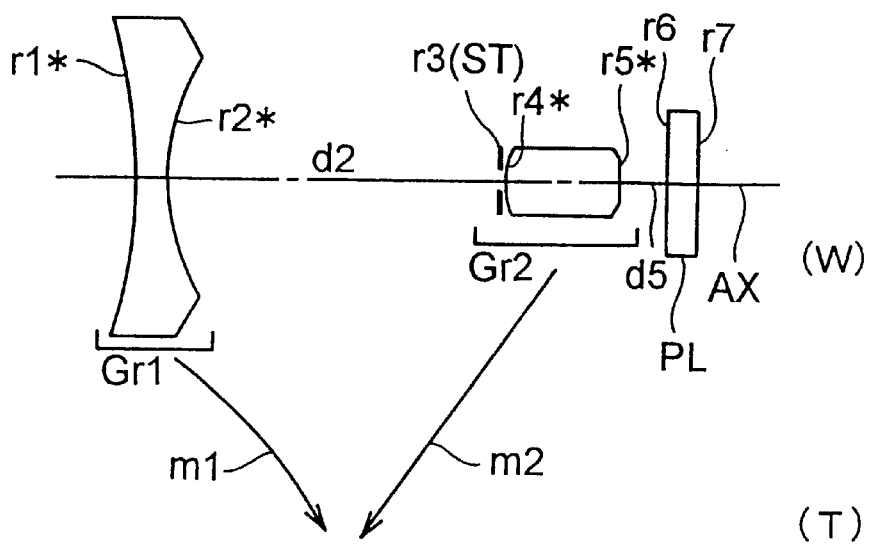
FIG. 8 is a lens arrangement diagram of an eighth embodiment (Example 8) of the invention.
Figure 9A:
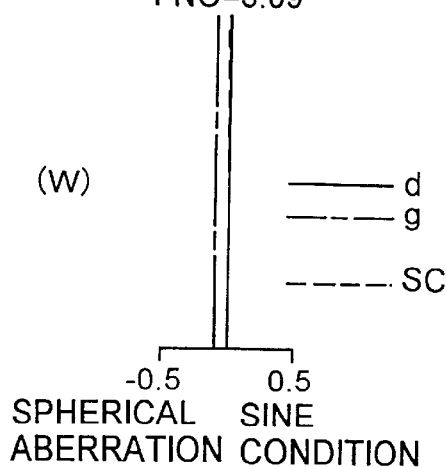
FIGS. 9A to 9I are aberration diagrams of Example 1.
Figure 9B:
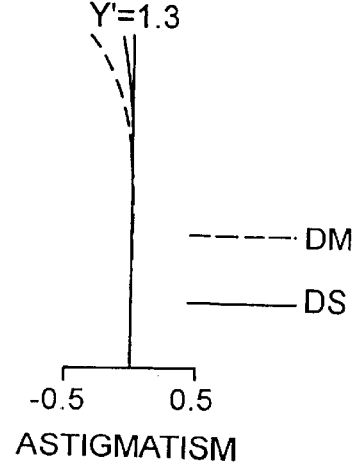
Figure 9C:
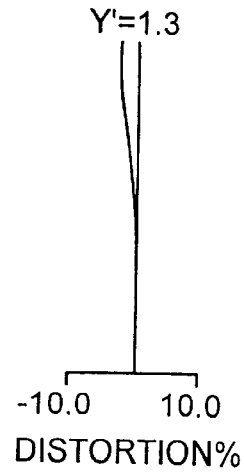
Figure 9D:
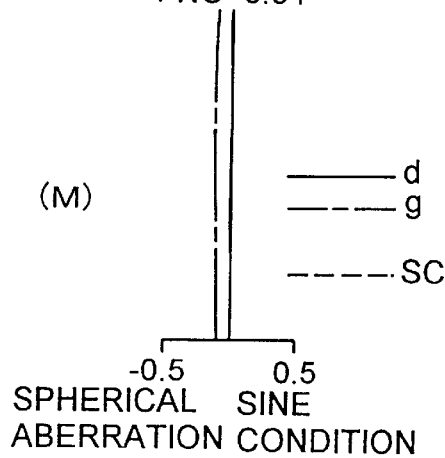
Figure 9E:
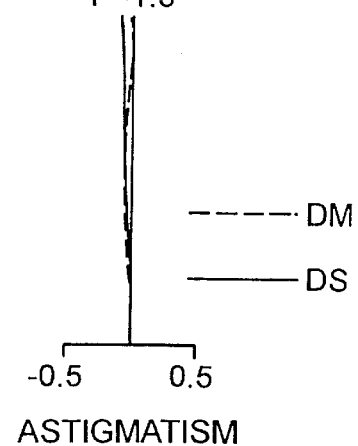
Figure 9F:
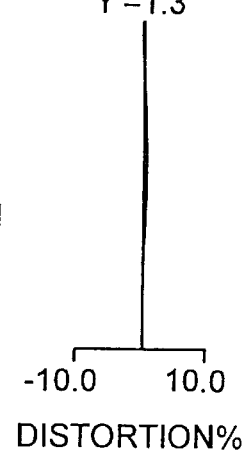
Figure 9G:
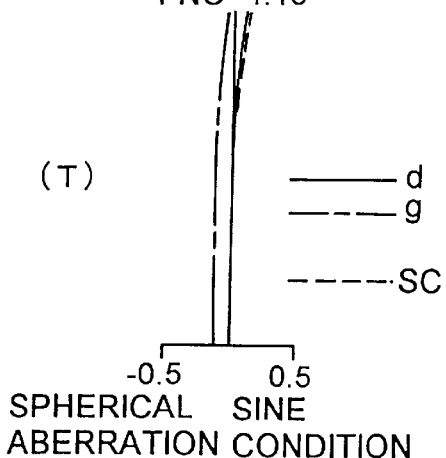
Figure 9H:
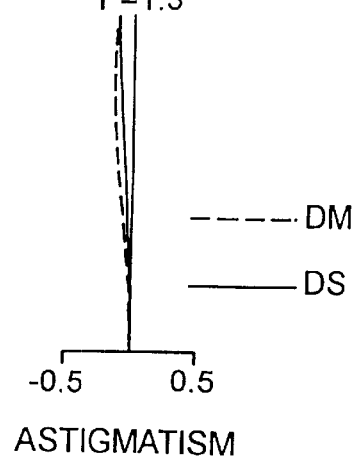
Figure 9I:
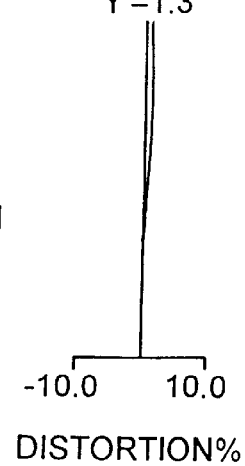
Figure 15A:
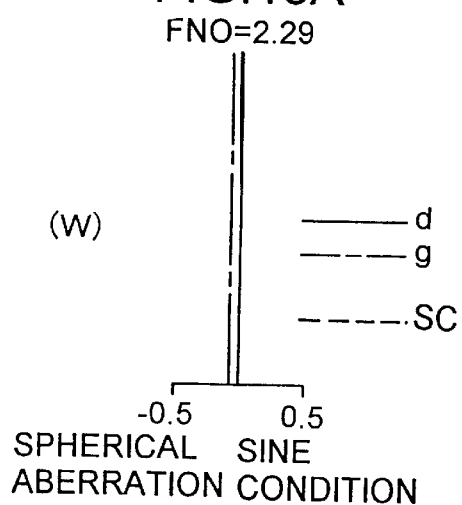
FIGS. 15A to 15I are aberration diagrams of Example 7.
Figure 15B:
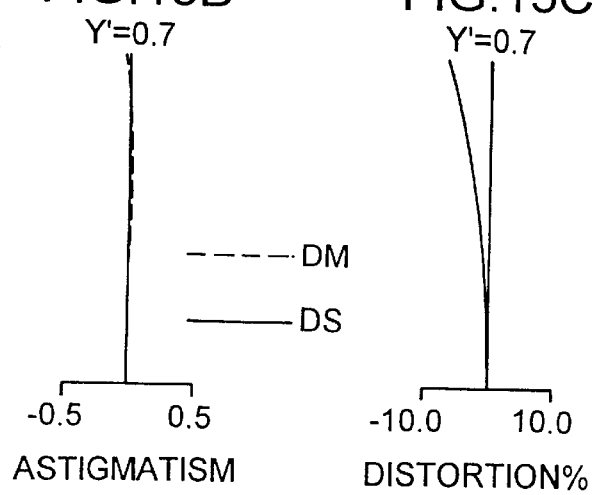
Figure 15C:
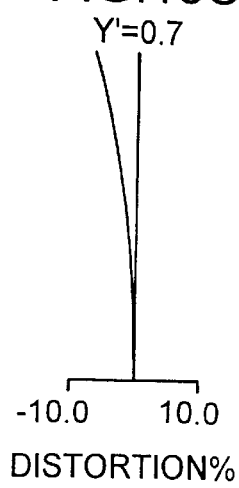
Figure 15D:
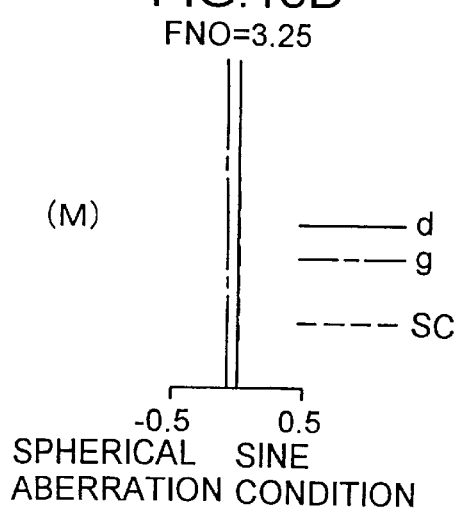
Figure 15E:
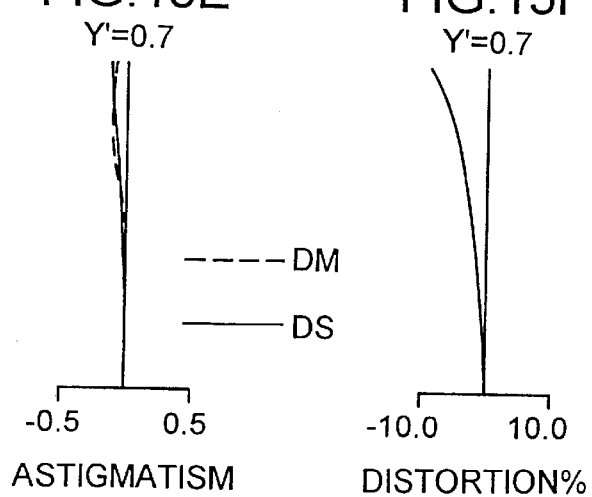
Figure 15F:
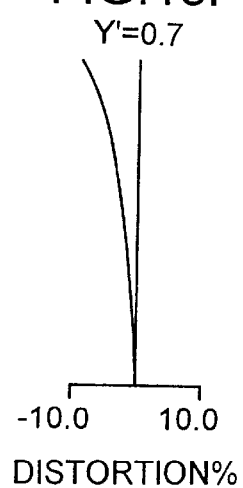
Figure 15G:
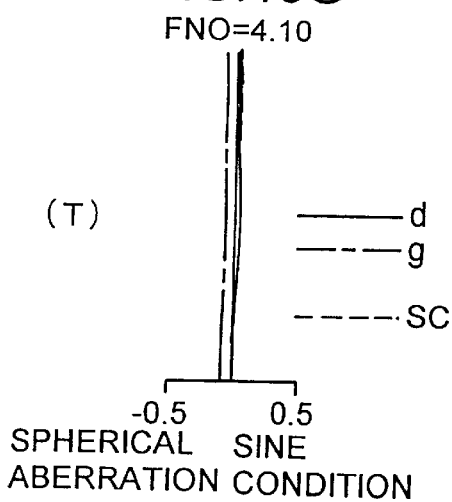
Figure 15H:
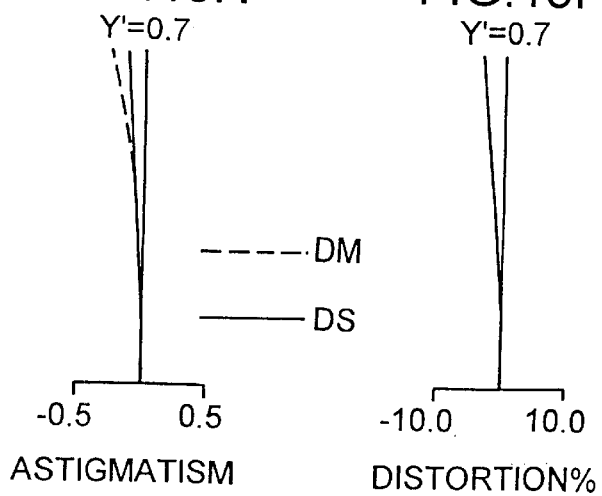
Figure 15I:
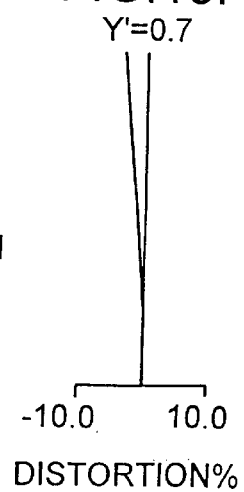
Figure 17:
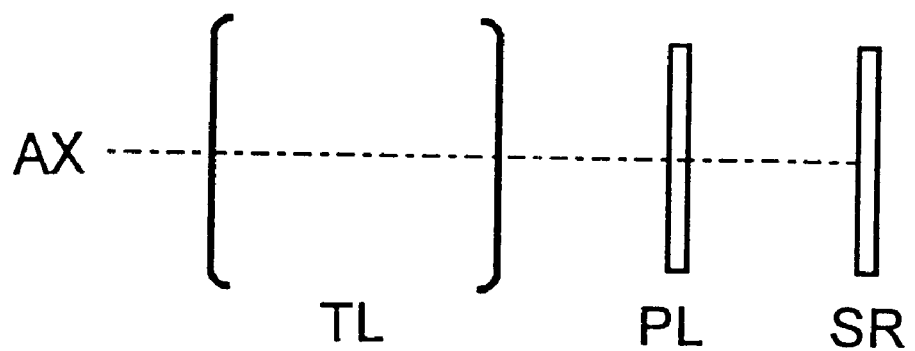
FIG. 17 is a diagram schematically illustrating an outline of the optical construction of a taking lens device embodying the invention.

Hereinafter, taking lens devices embodying the present invention will be described with reference to the drawings. A taking lens device optically takes in an image of a subject and then outputs the image as an electric signal. A taking lens device is used as a main component of a camera used to shoot a still or moving picture of a subject, for example a digital camera, a video camera, or a camera that is incorporated in or externally fitted to a device such as a digital video unit, a personal computer, a mobile computer, a portable telephone, or a personal digital assistant (PDA). For example as shown in FIG. 17, a taking lens device is composed of, from the object (subject) side, a taking lens system (TL) that forms an optical image of an object, a plane-parallel plate (PL) that functions as an optical low-pass filter or the like, and an image sensor (SR) that converts the optical image formed by the taking lens system (TL) into an electric signal.

In all the embodiments described hereinafter, the taking lens system (TL) is built as a zoom lens system composed of a plurality of lens units wherein zooming is achieved by moving two or more lens units along the optical axis (AX) in such a way that their unit-to-unit distances vary. The image sensor (SR) is realized, for example, with a solid-state image sensor such as a CCD or CMOS sensor having a plurality of pixels, and, by this image sensor (SR), the optical image formed by the zoom lens system is converted into an electric signal. The optical image to be formed by the zoom lens system has its spatial frequency characteristics adjusted by being passed through the low-pass filter (PL) that has predetermined cut-off frequency characteristics that are determined by the pixel pitch of the image sensor (SR). This helps minimize so-called aliasing noise that appears when the optical image is converted into an electric signal. The signal produced by the image sensor (SR) is subjected, as required, to predetermined digital image processing, image compression, and other processing, and is then, as a digital image signal, recorded in a memory (such as a semiconductor memory or an optical disk) or, if required, transmitted to another device by way of a cable or after being converted into an infrared signal.

FIGS. 1 to 8 are lens arrangement diagrams of the zoom lens system used in a first to an eighth embodiment of the present invention, each showing the lens arrangement at the wide-angle end (W) in an optical sectional view. In each lens arrangement diagram, an arrow mj (j=1, 2, 3) schematically indicates the movement of the j-th lens unit (Grj) during zooming from the wide-angle end (W) to the telephoto end (T) (a broken-line arrow mj, however, indicates that the corresponding lens unit is kept stationary during zooming). Moreover, in each lens arrangement diagram, ri (i=1, 2, 3, . . . ) indicates the i-th surface from the object (subject) side, and a surface ri marked with an asterisk (*) is an aspherical surface; di (i=1, 2, 3, . . . ) indicates the i-th axial distance from the object side, though only those which vary with zooming, called variable distances, are shown here.

In all of the first to eighth embodiments, the zoom lens system includes, from the object side, a first lens unit (Gr1) having a negative optical power and a second lens unit (Gr2) having a positive optical power, and achieves zooming by moving the first and second lens units (Gr1, Gr2) along the optical axis (AX). More specifically, in the first to fifth, seventh, and eighth embodiments (FIGS. 1 to 5, 7, and 8), the zoom lens system is of a negative-positive two-unit type; in the sixth embodiment (FIG. 6), the zoom lens system is of a negative-positive-positive three-unit type.

In all the embodiments, the zoom lens system is designed as a very compact zoom lens system compatible with ⅓-inch and similar formats used in digital cameras, digital video units, and the like provided with a solid-state image sensor (for example, a CCD), and thus has a flat glass plate (PL), which is a glass plane-parallel plate that functions as an optical low-pass filter or the like, disposed on the image side thereof. In all the embodiments, during zooming, the flat glass plate (PL) is kept stationary. In the sixth embodiment, the third lens unit (Gr3) also is kept stationary. Moreover, an aperture stop (ST) is disposed at the image-plane-side end of the second lens unit (Gr2) in the first, fourth, and seventh embodiments, between the lens elements of the second lens unit (Gr2) in the second and third embodiments, and at the object-side end of the second lens unit (Gr2) in the fifth, sixth, and eighth embodiments. This aperture stop (ST) moves together with the second lens unit (Gr2) during zooming.

In the first to eighth embodiments, the first lens unit (Gr1) is composed of one negative lens element. In the first to sixth embodiments, the second lens unit (Gr2) is composed of two lens elements; in the seventh and eighth embodiments, the second lens unit (Gr2) is composed of one positive lens element. In the first embodiment, the second lens unit (Gr2) is composed of a cemented lens element formed by cementing together two positive lens elements; in the fifth embodiment, the second lens unit (Gr2) is composed of a cemented lens element formed by cementing together one positive lens element and one negative lens element. As in the first to eighth embodiments, in a zoom lens system that is composed of two or more lens units starting with a negative and a positive lens unit, by minimizing the number of lens elements constituting each of the lens units (Gr1 to Gr3), it is possible to achieve cost reduction and miniaturization simultaneously.

In the design of a zoom lens system compatible with an image sensor (SR) with a relatively small effective image-sensing surface area, it is essential to reduce the absolute size of the zoom lens system itself. The most effective way to shorten the total length of the zoom lens system is to shorten the optical axis lengths of the individual lens units (Gr1 to Gr3). The most effective way to shorten the optical axis lengths of the individual lens units (Gr1 to Gr3) is to reduce the number of lens elements constituting each lens unit. Moreover, in arrangements of a negative-positive, negative-positive-positive, or any other type that starts with a negative lens unit, the first lens unit (Gr1) needs to be given a relatively strong negative optical power. However, if the first lens unit (Gr1) is composed of one negative lens element and is given a strong negative optical power on the object-side surface thereof, it bends off-axial incident rays too sharply. This makes it impossible to eliminate the off-axial aberration caused by the first lens unit (Gr1).

To avoid this, the negative lens element that constitutes the first lens unit (Gr1) is given, on the object-side surface thereof, a weak negative or positive optical power so as not to bend incident rays too sharply, and is given, on the image-side surface thereof, where off-axial rays travel at relatively small heights, a strong negative optical power. This makes it possible to correct off-axial aberration properly. Among various types of arrangement that start with a negative lens unit, those most suitable for miniaturization are a negative-positive two-unit type and a negative-positive-positive three-unit type in which the first and second lens units (Gr1, Gr2) are moved individually along the optical axis (AX) for zooming.

From this perspective, in a zoom lens system of a negative-positive two-unit type in which the first and second lens units (Gr1, Gr2) are moved along the optical axis (AX) for zooming, it is preferable that the first lens unit (Gr1) be composed of one negative lens element having a sharp curvature on the image-plane side thereof (i.e. a negative lens element having a sharper curvature on the image-side surface than on the object-side surface thereof), as in the first to fifth, seventh, and eighth embodiments. This makes it possible to realize a low-cost and compact zoom lens system. On the other hand, in a zoom lens system starting with a negative and a positive lens unit in which the first and second lens units (Gr1, Gr2) are moved along the optical axis (AX) for zooming (i.e. a zoom lens system including, from the object side, a negative and a positive movable lens unit), it is preferable that the first lens unit (Gr1) be composed of one negative lens element having a sharp curvature on the image-plane side and that the second lens unit (Gr2) be composed of two lens elements, namely, from the object side, one positive lens element and one positive (FIGS. 1 to 4 and 6) or negative (FIG. 5) lens element, as in the first to sixth embodiments. This makes it possible to realize a compact zoom lens system that offers a zoom ratio of about 2× to 3×.

As described earlier, to shorten the optical total length to the utmost limit, it is essential to shorten the optical axis lengths of the individual lens units, and the most effective way to achieve this is to reduce the number of lens elements constituting each lens unit. The optical total length of the first lens unit (Gr1) can be shortened by building it with one negative lens element having a sharp curvature on the image-plane side. On the other hand, an effective way to correct the under-side spherical aberration caused by the first, negative, lens unit (Gr1) is to use a positive lens element as the object-side lens element of the second lens unit (Gr2), where incident rays travel at great heights. Accordingly, by making this object-side, positive, lens element cause over-side spherical aberration in such a way as to cancel the under-side spherical aberration caused by the first, negative, lens unit (Gr1), it is possible to obtain satisfactory optical performance. Moreover, by disposing one negative or positive lens element as the image-plane-side lens element of the second lens unit (Gr2), it is possible to properly correct the spherical aberration resulting from overcorrection or undercorrection by the object-side, positive, lens element. In this way, it is possible to realize a zoom lens system that offers satisfactory aberration correction performance despite being compact.

It is preferable that the first lens unit (Gr1) fulfill conditional formulae (1) and (2) below as well. This makes it possible to realize a low-cost and compact zoom lens system.

$$0.3 < t1/Y' < 1.5 \tag{1}$$

$$1.4 < |f1/fw| < 5 \tag{2}$$

where t1 represents the axial thickness of the negative lens element constituting the first lens unit (Gr1);

Y' represents the maximum image height shootable;

f1 represents the focal length of the first lens unit (Gr1); and fw represents the focal length of the entire zoom lens system at the wide-angle end (W).

If the lower limit of conditional formula (1) is transgressed, the axial thickness of the negative lens element constituting the first lens unit (Gr1) is too small. This makes the lens element too easily breakable when it is made of glass, or hinders a smooth flow of the material in the molding process, when it is made of plastic. In either case, it is impossible to produce the lens element in practical terms. By contrast, if the upper limit of conditional formula (1) is transgressed, the axial thickness of the negative lens element constituting the first lens unit (Gr1) is too great. This makes the optical total length unduly great, and thus makes it impossible to achieve satisfactory miniaturization.

If the lower limit of conditional formula (2) is transgressed, the negative optical power of the first lens unit (Gr1) is too strong. This makes it impossible to correct the under-side spherical aberration caused by the first lens unit (Gr1) with the second, positive, lens unit (Gr2). As a result, it is impossible to obtain satisfactory performance. By contrast, if the upper limit of conditional formula (2) is transgressed, the negative optical power of the first lens unit (Gr1) is too weak. This unduly increases the zooming movement distance and the effective diameter of the first lens unit (Gr1), and thus makes it impossible to achieve satisfactory miniaturization.

It is preferable that the second lens unit (Gr2) be composed of two lens elements, namely, from the object side, one positive lens element convex to the object side and one biconvex lens element, as in the first to fourth and sixth embodiments. This helps make the zoom lens system compact. In arrangements of a zoom type starting with a negative and a positive lens unit, the under-side spherical aberration caused by the first lens unit (Gr1), which is a divergent unit, needs to be corrected with the second, positive, lens unit (Gr2). However, if the second lens unit (Gr2) is composed solely of one positive lens element, it is impossible to correct the under-side spherical aberration satisfactorily. By building the second lens unit (Gr2) with two lens elements, namely one positive lens element convex to the object side and one biconvex lens element, it is possible to strike a proper balance between satisfactory reduction of the thickness of the second lens unit (Gr2) and satisfactory correction of the under-side spherical aberration caused by the first, negative, lens unit (Gr1). Moreover, the use of a biconvex lens element as the image-plane-side lens element of the second lens unit (Gr2) makes it possible to give it a strong optical power and thereby secure a sufficient zoom ratio within the second lens unit (Gr2). Furthermore, by giving this biconvex, positive, lens element relatively low-dispersion optical characteristics, it is possible to suppress chromatic aberration as well.

It is preferable that the second lens unit (Gr2) be composed of two positive lens elements and that it fulfill conditional formulae (3) and (4) below, as in the first to sixth embodiments. This makes it possible to realize a zoom lens system that offers satisfactory imaging performance.

$$1 < f21/fw < 50 \quad (3)$$

$$0.5 < f22/fw < 5 \quad (4)$$

where
f21 represents the focal length of the object-side lens element of the second lens unit (Gr2); and
f22 represents the focal length of the image-side lens element of the second lens unit (Gr2).

The rays incident on the object-side, positive, lens element of the second lens unit (Gr2) travel at great heights, and this causes large longitudinal chromatic aberration to occur on both surfaces of that lens element. If the lower limit of conditional formula (3) is transgressed, the optical power of the object-side, positive, lens element of the second lens unit (Gr2) is too strong. This makes it impossible to eliminate the aforementioned longitudinal chromatic aberration. By contrast, if the upper limit of conditional formula (3) is transgressed, the optical power of the object-side, positive, lens element of the second lens unit (Gr2) is too weak. This makes it difficult to correct the spherical aberration caused by the first, negative, lens unit (Gr1).

If the lower limit of conditional formula (4) is transgressed, the optical power of the image-plane-side, positive, lens element of the second lens unit (Gr2) is too strong. This makes it impossible to eliminate over-side spherical aberration. By contrast, if the upper limit of conditional formula (4) is transgressed, the optical power of the image-plane-side, positive, lens element of the second lens unit (Gr2) is too weak. This makes the distance over which the second lens unit (Gr2) needs to be moved to secure the desired zoom ratio unduly long, and thus hinders miniaturization.

Building a relatively large lens unit, like the first lens unit (Gr1), with aspherical lens elements made of glass results in making the cost of a zoom lens system unduly high. An effective way to reduce the cost of a zoom lens system is to use lens elements made of plastic. However, the back focus of plastic lens elements tends to vary with temperature. To minimize such variation of the back focus with temperature, it is preferable that the first lens unit (Gr1) be composed of one plastic lens element having a sharp curvature on the image-plane side and that the second lens unit (Gr2) have at least one plastic lens element on the image-plane side. In Examples 4 and 6 described later, the negative lens element constituting the first lens unit (Gr1) and the image-side, positive, lens element of the second lens unit (Gr2) are plastic lenses. Using plastic lenses as the negative lens element constituting the first lens unit (Gr1) and the positive lens element used in the second lens unit (Gr2) makes it possible to cancel variation of the back focus with temperature. In this way, it is possible to realize a zoom lens system that maintains satisfactory performance even in environments with great temperature variation.

To obtain satisfactory performance, it is preferable that the second lens unit (Gr2) be given an optical power arrangement of "weakly positive" plus "strongly positive." On the other hand, to give the second lens unit (Gr2) such temperature characteristics as to cancel variation of the back focus, it is necessary that a lens element with a considerably strong optical power be made of plastic. To meet these requirements, it is advisable to dispose at least one plastic lens element on the image-plane side of the second lens unit (Gr2). For effective temperature compensation, it is preferable that the plastic lens have an Abbe number (vd) of about 40 to 60.

In a zoom lens system in which the first and second lens units (Gr1, Gr2) each include a plastic lens element as described above, it is preferable that the second lens unit (Gr2) be composed of two positive lens elements and that it fulfill conditional formula (5) below. This makes it possible to realize a zoom lens system with minimum variation in performance with temperature.

$$0.3 < f22/ft < 2 \quad (5)$$

where
f22 represents the focal length of the image-plane-side lens element of the second lens unit (Gr2); and
ft represents the focal length of the entire zoom lens system at the telephoto end (T).

In a zoom type starting with a negative and a positive lens unit, the second lens unit (Gr2) has a strong positive optical power. Now, suppose that the second lens unit (Gr2) is composed of two lens elements. If the second lens unit (Gr2) is composed of one positive plastic lens element and one negative lens element, the optical power of the plastic lens element thereof is too strong to compensate for the variation of the back focus with temperature that occurs in the first lens unit (Gr1) composed of a negative plastic lens element. This makes it impossible to maintain satisfactory performance under temperature variation. To overcome this, it is essential to build the second lens unit (Gr2) with two positive lens elements and give the plastic lens element an adequate optical power. Conditional formula (5) defines the condition to be fulfilled to achieve this.

If the lower limit of conditional formula (5) is transgressed, the optical power of the positive plastic lens element of the second lens unit (Gr2) is so strong that a rise in temperature causes the imaging point to move toward the object (i.e. makes the back focus shorter). This makes it impossible to maintain satisfactory performance. By contrast, if the upper limit of conditional formula (5) is transgressed, the optical power of the positive plastic lens element of the second lens unit (Gr2) is so weak that a rise in temperature causes the imaging point to move toward the photographer (i.e. makes the back focus longer). This makes it impossible to maintain satisfactory performance.

In a zoom lens system in which the first and second lens units (Gr1, Gr2) each include a plastic lens element, it is preferable that the second lens unit (Gr2) be composed of two positive lens elements and that it fulfill conditional formula (6) below. This makes it possible to realize a zoom lens system with better aberration correction performance.

$$0.5 < f21/ft < 20 \tag{6}$$

where f21 represents the focal length of the object-side lens element of the second lens unit (Gr2); and ft represents the focal length of the entire zoom lens system at the telephoto end (T).

The rays incident on the object-side, positive, lens element of the second lens unit (Gr2) travel at great heights, and this causes large longitudinal chromatic aberration. If the lower limit of conditional formula (6) is transgressed, the optical power of the object-side, positive, lens element of the second lens unit (Gr2) is too strong. This makes it impossible to eliminate the longitudinal chromatic aberration that occurs at the telephoto end (T). By contrast, if the upper limit of conditional formula (6) is transgressed, the optical power of the object-side, positive, lens element of the second lens unit (Gr2) is too weak. This makes it difficult to correct the spherical aberration caused by the first, negative, lens unit (Gr1) at the telephoto end (T).

In a zoom lens system starting with a negative and a positive lens unit in which the first and second lens units (Gr1, Gr2) are moved along the optical axis (AX) for zooming, it is preferable that the first lens unit (Gr1) be composed of a single lens element having a sharp curvature on the image-plane side and that the second lens unit (Gr2) be composed of a single lens element having a sharp curvature on the object side as in the seventh and eighth embodiments. This makes it possible to realize a very low-cost, compact zoom lens system.

As described earlier, in a case where the first lens unit (Gr1) is composed of one negative lens element, if this lens element is given a strong negative optical power on the object side, it bends off-axial incident rays too sharply. This makes it impossible to eliminate the resulting off-axial aberration. For this reason, the negative lens element constituting the first lens unit (Gr1) is given, on the object-side surface thereof, a weak negative or positive optical power so as not to bend incident rays too sharply, and is given, on the image-plane-side surface thereof, where off-axial rays travel at relatively small heights, a strong negative optical power. This makes it possible to correct off-axial aberration properly. Moreover, in a case where the second lens unit (Gr2) is composed of one positive lens element, by giving it a sharp curvature on the object side, it is possible to properly correct the over-side spherical aberration that is caused by the first, negative, lens unit (Gr1). In an arrangement like this where the first lens unit (Gr1) is composed of a single lens element having a sharp curvature on the image-plane side and the second lens unit (Gr2) is composed of a single lens element having a sharp curvature on the object side, it is preferable that conditional formula (2) described earlier be fulfilled as well. This makes it possible, as described earlier, to realize a zoom lens system that offers satisfactory aberration correction performance despite being compact.

As in the seventh and eighth embodiments, in a zoom type in which the first lens unit (Gr1) is composed of a single lens element having a sharp curvature on the image-plane side and the second lens unit (Gr2) is composed of a single lens element having a sharp curvature on the object side, the optical power of the first lens unit (Gr1) is relatively weak, and therefore the variation of the back focus and of imaging performance with temperature that occurs in the first lens unit (Gr1) is small. However, the second lens unit (Gr2) has a relatively strong positive optical power, and therefore it is affected by greater variation of various parameters with temperature. To overcome this, it is preferable either to use a glass lens element as the single lens element constituting the second lens unit (Gr2) or to use plastic lens elements as both of the single lens elements constituting the first and second lens units (Gr1, Gr2) respectively.

If a glass lens element is used as the single lens element constituting the second lens unit (Gr2), the second lens unit (Gr2) is less affected by temperature variation. This makes it possible to realize a zoom lens system with minimum variation of the back focus with temperature. If plastic lens elements are used as both of the single lens elements constituting the first and second lens units (Gr1, Gr2) respectively, it is possible to cancel, with the relatively strong positive optical power of the second lens unit (Gr2), the relatively small variation of the back focus with temperature that occurs in the first lens unit (Gr1). This makes it possible to realize a zoom lens system with minimum variation of the back focus with temperature. In Example 8 described later, a glass lens element is used as the single lens element constituting the second lens unit (Gr2); in Example 7 described later, plastic lens elements are used as both of the single lens elements constituting the first and second lens units (Gr1, Gr2) respectively.

In all of the embodiments described hereinbefore, all the lens units are composed solely of refractive lens elements that deflect light incident thereon by refraction (i.e. lens elements of the type that deflects light at the interface between two media having different refractive indices). However, any of these lens units may include, for example, a diffractive lens element that deflects light incident thereon by diffraction, a refractive-diffractive hybrid lens element that deflects light incident thereon by the combined effects of refraction and diffraction, a gradient-index lens element that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the middle of the zoom lens system. Where to bend the optical path may be determined to suit particular needs. By bending the optical path appropriately, it is possible to make a camera apparently slimmer. It is possible even to build an arrangement in which zooming or the collapsing movement of a lens barrel does not cause any change in the thickness of a camera. For example, by keeping the first lens unit (Gr1) stationary during zooming, and disposing a mirror behind the first lens unit (Gr1) so that the optical path is bent by 90° by the reflecting surface of the mirror, it is possible to keep the front-to-rear length of the zoom lens system constant and thereby make a camera slimmer.

In all the embodiments, an optical low-pass filter having the shape of a plane-parallel plate (PL) is disposed between the last surface of the zoom lens system and the image sensor (SR). However, as this low-pass filter, it is also possible to use a birefringence-type low-pass filter made of quartz or the like having its crystal axis aligned with a predetermined direction, a phase-type low-pass filter that achieves the required optical cut-off frequency characteristics by exploiting diffraction, or a low-pass filter of any other type.

PRACTICAL EXAMPLES

Hereinafter, practical examples of the construction of the zoom lens system used in taking lens devices embodying the present invention will be presented in more detail with reference to their construction data, aberration diagrams, and other data. Examples 1 to 8 presented below respectively correspond to the first to eighth embodiments described hereinbefore, and the lens arrangement diagrams (FIGS. 1 to 8) showing the lens arrangement of the first to eighth embodiments apply also to Examples 1 to 8, respectively.

Tables 1 to 8 list the construction data of Examples 1 to 8, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. Moreover, in the construction data, for each of those axial distances that vary with zooming (i.e. variable aerial distances), three values are given that are, from left, the axial distance at the wide-angle end (at the shortest-focal-length end, W), the axial distance in the middle position (in the middle-focal-length position, M), and the axial distance at the telephoto end (at the longest-focal-length end, T). Also listed are the focal length (f, mm) and the f-number (FNO) of the entire optical system in those three focal-length positions (W), (M), and (T). Table 9 lists the values of the conditional formulae as actually observed in Examples 1 to 8.

A surface whose radius of curvature ri is marked with an asterisk (*) is an aspherical surface, of which the surface shape is defined by formula (AS) below. The aspherical surface data of Examples 1 to 8 is also listed in their respective construction data.

$$X(H) = (C0 \cdot H^2)/\left(1 + \sqrt{1 - \varepsilon \cdot C0^2 \cdot H^2}\right) + \quad \text{(AS)}$$
$$(A4 \cdot H^4 + A6 \cdot H^6 + A8 \cdot H^8 + A10 \cdot H^{10})$$

where

X(H) represents the displacement along the optical axis at the height H (relative to the vertex);

H represents the height in a direction perpendicular to the optical axis;

C0 represents the paraxial curvature (=the reciprocal of the radius of curvature);

$\varepsilon$ represents the quadric surface parameter; and

Ai represents the aspherical surface coefficient of i-th order.

FIGS. 9A–9I, 10A–10I, 11A–11I, 12A–12I, 13A–13I, 14A–14I, 15A–15I, and 16A–16I are aberration diagrams of Examples 1 to 8, respectively. Of these diagrams, FIGS. 9A–9C, 10A–10C, 11A–11C, 12A–12C, 13A–13C, 14A–14C, 15A–15C, and 16A–16C show the aberration observed at the wide-angle end (W), FIGS. 9D–9F, 10D–10F, 11D–11F, 12D–12F, 13D–13F, 14D–14F, 15D–15F, and 16D–16F show the aberration observed in the middle position (M), and FIGS. 9G–9I, 10G–10I, 11G–11I, 12G–12I, 13G–13I, 14G–14I, 15G–15I, and 16G–16I show the aberration observed at the telephoto end (T). Of these diagrams, FIG. 9A, 9D, 9G, 10A, 10D, 10G, 11A, 11D, 11G, 12A, 12D, 12G, 13A, 13D, 13G, 14A, 14D, 14G, 15A, 15D, 15G, 16A, 16D, and 16G show spherical aberration, FIG. 9B, 9E, 9H, 10B, 10E, 10H, 11B, 11E, 11H, 12B, 12E, 12H, 13B, 13E, 13H, 14B, 14E, 14H, 15B, 15E, 15H, 16B, 16E, and 16H show astigmatism, and FIG. 9C, 9F, 9I, 10C, 10F, 10I, 11C, 11F, 11I, 12C, 12F, 12I, 13C, 13F, 13I, 14C, 14F, 14I, 15C, 15F, 15I, 16C, 16F, and 16I show distortion. In these diagrams, Y' represents the maximum image height (mm). In the diagrams showing spherical aberration, a solid line (d) and a dash-and-dot line (g) show the spherical aberration for the d-line and for the g-line, respectively, and a broken line (SC) shows the sine condition. In the diagrams showing astigmatism, a broken line (DM) and a solid line (DS) represent the astigmatism for the d-line on the meridional plane and on the sagittal plane, respectively. In the diagrams showing distortion, a solid line represents the distortion (%) for the d-line.

TABLE 1

Construction Data of Example 1
f = 2.0(W)~2.8(M)~3.7(T), FNO = 3.09(W)~3.64(M)~4.18(T)

| Radius of Curvature | Axial Distance | Refractive Index | Abbe Number |
|---|---|---|---|
| r1* = −169.079 | d1 = 0.924 | N1 = 1.52200 | v1 = 52.20 |
| r2* = 2.200 | d2 = 3.703~1.996~4.114 | | |
| r3* = 2.074 | d3 = 1.600 | N2 = 1.80420 | v2 = 46.50 |
| r4 = 7.532 | d4 = 1.450 | N3 = 1.58463 | v3 = 60.65 |
| r5* = −10.154 | d5 = 0.200 | | |
| r6 = ∞(ST) | d6 = 0.400~0.947~1.505 | | |
| r7 = ∞ | d7 = 1.700 | N4 = 1.51680 | v4 = 64.20 |
| r8 = ∞ | | | |

Aspherical Surface Data of Surface r1
$\varepsilon = 0.10000 \times 10$, A4 = $0.85773 \times 10^{-2}$, A6 = $-0.21267 \times 10^{-2}$, A8 = $0.29253 \times 10^{-3}$, A10 = $-0.24603 \times 10^{-4}$
Aspherical Surface Data of Surface r2
$\varepsilon = 0.10000 \times 10$, A4 = $0.41716 \times 10^{-3}$, A6 = $0.38291 \times 10^{-2}$, A8 = $-0.26764 \times 10^{-2}$
Aspherical Surface Data of Surface r3
$\varepsilon = 0.10000 \times 10$, A4 = $-0.63784 \times 10^{-2}$, A6 = $-0.14167 \times 10^{-2}$, A8 = $-0.42493 \times 10^{-2}$, A10 = $0.31980 \times 10^{-2}$
Aspherical Surface Data of Surface r5
$\varepsilon = 0.10000 \times 10$, A4 = $0.30068 \times 10^{-1}$, A6 = $0.32197$, A8 = $-0.84844$, A10 = $0.71957$

TABLE 2

Construction Data of Example 2
f = 1.7(W)~2.5(M)~3.2(T), FNO = 3.10(W)~3.60(M)~4.10(T)

| Radius of Curvature | Axial Distance | Refractive Index | Abbe Number |
|---|---|---|---|
| r1* = −11.843 | d1 = 0.800 | N1 = 1.52200 | v1 = 52.20 |
| r2* = 2.000 | d2 = 3.291~1.655~0.800 | | |
| r3* = 2.298 | d3 = 1.741 | N2 = 1.84666 | v2 = 23.82 |
| r4 = 1.600 | d4 = 0.168 | | |
| r5* = ∞(ST) | d5 = 0.100 | | |
| r6* = 1.600 | d6 = 1.400 | N3 = 1.58913 | v3 = 61.25 |

TABLE 2-continued

Construction Data of Example 2
f = 1.7(W)~2.5(M)~3.2(T), FNO = 3.10(W)~3.60(M)~4.10(T)

| Radius of Curvature | Axial Distance | Refractive Index | Abbe Number |
|---|---|---|---|
| r7 = −2.488 | d7 = 0.800~1.465~2.125 | | |
| r8 = ∞ | d8 = 0.800 | N4 = 1.51680 | ν4 = 64.20 |
| r9 = ∞ | | | |

Aspherical Surface Data of Surface r1
$\epsilon = 0.10000 \times 10$, A4 = $0.017282 \times 10^{-1}$, A6 = $-0.12098 \times 10^{-2}$, A8 = $-0.86144 \times 10^{-4}$, A10 = $0.94067 \times 10^{-5}$
Aspherical Surface Data of Surface r2
$\epsilon = 0.10000 \times 10$, A4 = $0.25673 \times 10^{-3}$, A6 = $0.19207 \times 10^{-1}$, A8 = $-0.64417 \times 10^{-2}$
Aspherical Surface Data of Surface r3
$\epsilon = 0.10000 \times 10$, A4 = $-0.20650 \times 10^{-2}$, A6 = $-0.27673 \times 10^{-1}$, A8 = $0.23767 \times 10^{-1}$
Aspherical Surface Data of Surface r6
$\epsilon = 0.10000 \times 10$, A4 = $-0.76423 \times 10^{-1}$, A6 = 0.40252, A8 = −0.59172
Aspherical Surface Data of Surface r7
$\epsilon = 0.57296$, A4 = $0.14827 \times 10^{-1}$, A6 = 0.10521, A8 = $-0.69664 \times 10^{-1}$

TABLE 3

Construction Data of Example 3
f = 1.9(W)~2.8(M)~3.6(T), FNO = 3.19(W)~3.65(M)~4.10(T)

| Radius of Curvature | Axial Distance | Refractive Index | Abbe Number |
|---|---|---|---|
| r1* = 6.444 | d1 = 0.800 | N1 = 1.58913 | ν1 = 61.11 |
| r2* = 1.800 | d2 = 3.837~1.842~0.800 | | |
| r3* = 1.928 | d3 = 1.413 | N2 = 1.58340 | ν2 = 30.23 |
| r4 = 1.603 | d4 = 0.100 | | |
| r5 = ∞(ST) | d5 = 0.0 | | |
| r6* = 1.600 | d6 = 1.150 | N3 = 1.51680 | ν3 = 64.20 |
| r7 = −2.678 | d7 = 0.800~1.254~1.792 | | |
| r8 = ∞ | d8 = 0.800 | N4 = 1.51680 | ν4 = 64.20 |
| r9 = ∞ | | | |

Aspherical Surface Data of Surface r1
$\epsilon = 0.10000 \times 10$, A4 = $-0.93755 \times 10^{-2}$, A6 = $0.91669 \times 10^{-2}$, A8 = $-0.21303 \times 10^{-2}$, A10 = $0.14652 \times 10^{-3}$
Aspherical Surface Data of Surface r2
$\epsilon = 0.10000 \times 10$, A4 = $-0.24926 \times 10^{-1}$, A6 = $0.32313 \times 10^{-1}$, A8 = $-0.11464 \times 10^{-1}$
Aspherical Surface Data of Surface r3
$\epsilon = 0.10000 \times 10$, A4 = $-0.30635 \times 10^{-2}$, A6 = $-0.37628 \times 10^{-1}$, A8 = $0.25327 \times 10^{-1}$
Aspherical Surface Data of Surface r6
$\epsilon = 0.10000 \times 10$, A4 = $-0.70794 \times 10^{-1}$, A6 = 0.50525, A8 = −0.92562
Aspherical Surface Data of Surface r7
$\epsilon = 0.10781 \times 10$, A4 = $0.51054 \times 10^{-2}$, A6 = 0.11223, A8 = $-0.95389 \times 10^{-1}$

TABLE 4

Construction Data of Example 4
f = 2.3(W)~4.2(M)~5.6(T), FNO = 2.95(W)~3.62(M)~4.10(T)

| Radius of Curvature | Axial Distance | Refractive Index | Abbe Number |
|---|---|---|---|
| r1* = 23.363 | d1 = 1.200 | N1 = 1.52200 | ν1 = 52.20 |
| r2* = 3.480 | d2 = 10.247~3.184~1.000 | | |
| r3* = 3.586 | d3 = 4.000 | N2 = 1.58340 | ν2 = 30.23 |
| r4 = 2.800 | d4 = 0.113 | | |
| r5* = 3.426 | d5 = 1.300 | N2 = 1.52200 | ν3 = 52.20 |
| r6* = −2.900 | d6 = 0.300 | | |
| r7 = ∞(ST) | d7 = 0.700~1.765~2.596 | | |
| r8 = ∞ | d8 = 1.640 | N4 = 1.51680 | ν4 = 64.20 |
| r9 = ∞ | | | |

Aspherical Surface Data of Surface r1

TABLE 4-continued

Construction Data of Example 4
f = 2.3(W)~4.2(M)~5.6(T), FNO = 2.95(W)~3.62(M)~4.10(T)

| Radius of Curvature | Axial Distance | Refractive Index | Abbe Number |
|---|---|---|---|

$\epsilon = 0.10000 \times 10$, A4 = $-0.97582 \times 10^{-3}$, A6 = $0.32128 \times 10^{-3}$, A8 = $-0.25843 \times 10^{-4}$, A10 = $0.59428 \times 10^{-6}$
Aspherical Surface Data of Surface r2
$\epsilon = 0.10000 \times 10$, A4 = $-0.22569 \times 10^{-2}$, A6 = $0.54823 \times 10^{-3}$, A8 = $-0.79189 \times 10^{-4}$
Aspherical Surface Data of Surface r3
$\epsilon = 0.10000 \times 10$, A4 = $-0.19115 \times 10^{-2}$, A6 = $-0.37996 \times 10^{-3}$, A8 = $0.26434 \times 10^{-4}$
Aspherical Surface Data of Surface r5
$\epsilon = 0.10000 \times 10$, A4 = $-0.38606 \times 10^{-1}$, A6 = $0.59438 \times 10^{-1}$, A8 = $-0.58858 \times 10^{-1}$
Aspherical Surface Data of Surface r6
$\epsilon = 0.34105 \times 10$, A4 = $0.17925 \times 10^{-2}$, A6 = $0.96541 \times 10^{-2}$, A8 = $-0.71627 \times 10^{-2}$

TABLE 5

Construction Data of Example 5
f = 2.1(W)~3.1(M)~4.1(T), FNO = 3.26(W)~3.69(M)~4.10(T)

| Radius of Curvature | Axial Distance | Refractive Index | Abbe Number |
|---|---|---|---|
| r1* = 8.554 | d1 = 0.800 | N1 = 1.52200 | ν1 = 52.20 |
| r2* = 2.283 | d2 = ~5.712~2.892~1.418 | | |
| r3 = ∞(ST) | d3 = 1.000 | | |
| r4* = 2.248 | d4 = 1.923 | N2 = 1.84839 | ν2 = 40.17 |
| r5 = −1.508 | d5 = 1.000 | N3 = 1.84666 | ν3 = 23.82 |
| r6 = 6.295 | d6 = 0.757~1.217~1.675 | | |
| r7 = ∞ | d7 = 1.000 | N4 = 1.51680 | ν4 = 64.20 |
| r8 = ∞ | | | |

Aspherical Surface Data of Surface r1
$\epsilon = 0.10000 \times 10$, A4 = $0.57609 \times 10^{-2}$, A6 = $-0.31656 \times 10^{-3}$, A8 = $-0.11109 \times 10^{-3}$, A10 = $0.85960 \times 10^{-5}$
Aspherical Surface Data of Surface r2
$\epsilon = 0.10000 \times 10$, A4 = $0.10958 \times 10^{-1}$, A6 = $0.69338 \times 10^{-3}$, A8 = $-0.11295 \times 10^{-2}$
Aspherical Surface Data of Surface r4
$\epsilon = 0.10000 \times 10$, A4 = $0.13736 \times 10^{-3}$, A6 = $-0.79399 \times 10^{-2}$, A8 = $0.11403 \times 10^{-1}$, A10 = $0.31980 \times 10^{-3}$
Aspherical Surface Data of Surface r6
$\epsilon = 0.10000 \times 10$, A4 = $0.54167 \times 10^{-1}$, A6 = 0.15475, A8 = $-0.20373 \times 10^{-2}$, A10 = $0.19488 \times 10^{-1}$

TABLE 6

Construction Data of Example 6
f = 1.8(W)~3.6(M)~5.2(T), FNO = 2.20(W)~3.21(M)~4.10(T)

| Radius of Curvature | Axial Distance | Refractive Index | Abbe Number |
|---|---|---|---|
| r1* = −11.542 | d1 = 0.900 | N1 = 1.52200 | ν1 = 52.20 |
| r2* = 2.800 | d2 = 4.826~1.821~0.911 | | |
| r3 = ∞(ST) | d3 = 0.300 | | |
| r4* = 2.391 | d4 = 1.800 | N2 = 1.80518 | ν2 = 25.43 |
| r5 = 2.567 | d5 = 1.100 | | |
| r6 = 2.570 | d6 = 1.124 | N3 = 1.52200 | ν3 = 52.20 |
| r7 = −10.043 | d7 = 0.400~2.454~4.296 | | |
| r8 = 3.001 | d8 = 1.000 | N4 = 1.58913 | ν4 = 61.25 |
| r9* = 4.900 | d9 = 0.836 | | |
| r10 = ∞ | d10 = 0.700 | N5 = 1.51680 | ν5 = 64.20 |
| r11 = ∞ | | | |

Aspherical Surface Data of Surface r1
$\epsilon = 0.10000 \times 10$, A4 = $0.79845 \times 10^{-2}$, A6 = $0.18758 \times 10^{-3}$, A8 = $-0.79325 \times 10^{-4}$, A10 = $0.37777 \times 10^{-5}$
Aspherical Surface Data of Surface r2
$\epsilon = 0.10000 \times 10$, A4 = $-0.70403 \times 10^{-2}$, A6 = $0.13718 \times 10^{-1}$, A8 = $-0.31350 \times 10^{-2}$, A10 = $0.29830 \times 10^{-3}$
Aspherical Surface Data of Surface r4

TABLE 6-continued

Construction Data of Example 6
f = 1.8(W)~3.6(M)~5.2(T), FNO = 2.20(W)~3.21(M)~4.10(T)

| Radius of Curvature | Axial Distance | Refractive Index | Abbe Number |
|---|---|---|---|

$\epsilon = 0.10000 \times 10$, A4 = $-0.11093 \times 10^{-1}$, A6 = $0.92980 \times 10^{-2}$, A8 = $-0.53782 \times 10^{-2}$, A10 = $0.92193 \times 10^{-3}$
Aspherical Surface Data of Surface r7
$\epsilon = 0.10000 \times 10$, A4 = $0.41827 \times 10^{-2}$, A6 = $0.82585 \times 10^{-1}$, A8 = $-0.15599$, A10 $\times 0.11075$
Aspherical Surface Data of Surface r9
$\epsilon = 0.10000 \times 10$, A4 = $0.38672 \times 10^{-1}$, A6 = $-0.12082 \times 10^{-1}$, A8 = $-0.43639 \times 10^{-2}$, A10 = $0.18801 \times 10^{-2}$

TABLE 7

Construction Data of Example 7
f = 1.1(W)~2.3(M)~3.3(T), FNO = 2.29(W)~3.25(M)~4.10(T)

| Radius of Curvature | Axial Distance | Refractive Index | Abbe Number |
|---|---|---|---|
| r1* = −5.000 | d1 = 0.800 | N1 = 1.52200 | ν1 = 52.20 |
| r2* = 3.209 | d2 = 5.776~1.965~0.800 | | |
| r3* = 1.371 | d3 = 2.524 | N2 = 1.52200 | ν2 = 52.20 |
| r4* = −5.023 | d4 = 0.200 | | |
| r5 = ∞(ST) | d5 = 0.600~1.347~2.005 | | |
| r6 = ∞ | d6 = 0.800 | N3 = 1.51680 | ν3 = 64.20 |
| r7 = ∞ | | | |

Aspherical Surface Data of Surface r1
$\epsilon = 0.10000 \times 10$, A4 = $0.26532 \times 10^{-1}$, A6 = $-0.50406 \times 10^{-2}$, A8 = $0.37256 \times 10^{-3}$, A10 = $-0.60834 \times 10^{-5}$
Aspherical Surface Data of Surface r2
$\epsilon = 0.10000 \times 10$, A4 = $0.24195 \times 10^{-1}$, A6 = $-0.62748 \times 10^{-2}$, A8 = $0.11447 \times 10^{-2}$, A10 = $0.26741 \times 10^{-3}$
Aspherical Surface Data of Surface r3
$\epsilon = 0.10000 \times 10$, A4 = $-0.28621 \times 10^{-1}$, A6 = $-0.34253 \times 10^{-1}$, A8 = $0.30036 \times 10^{-1}$, A10 = $-0.19887 \times 10^{-1}$
Aspherical Surface Data of Surface r4
$\epsilon = 0.10000 \times 10$, A4 = $0.25671$, A6 = $-0.30528 \times 10$, A8 = $0.22536 \times 10^{+2}$, A10 = $-0.59558 \times 10^{+2}$

TABLE 8

Construction Data of Example 8
f = 2.0(W)~4.1(M)~5.9(T), FNO = 3.00(W)~3.60(M)~4.10(T)

| Radius of Curvature | Axial Distance | Refractive Index | Abbe Number |
|---|---|---|---|
| r1* = −9.035 | d1 = 1.000 | N1 = 1.52200 | ν1 = 52.20 |
| r2* = 8.151 | d2 = ~10.798~3.063~0.700 | | |
| r3 = ∞(ST) | d3 = 0.100 | | |
| r4* = 2.080 | d4 = 3.748 | N2 = 1.51728 | ν2 = 69.43 |
| r5* = −34.196 | d5 = 1.555~2.553~3.431 | | |
| r6 = ∞ | d6 = 1.000 | N3 = 1.51680 | ν3 = 64.20 |
| r7 = ∞ | | | |

Aspherical Surface Data of Surface r1
$\epsilon = 0.10000 \times 10$, A4 = $0.44973 \times 10^{-2}$, A6 = $-0.26168 \times 10^{-3}$, A8 = $0.59240 \times 10^{-5}$, A10 = $-0.29627 \times 10^{-7}$
Aspherical Surface Data of Surface r2
$\epsilon = 0.10000 \times 10$, A4 = $0.41154 \times 10^{-2}$, A6 = $-0.29470 \times 10^{-3}$, A8 = $-0.54518 \times 10^{-5}$, A10 = $0.55793 \times 10^{-6}$
Aspherical Surface Data of Surface r4
$\epsilon = 0.10000 \times 10$, A4 = $-0.56680 \times 10^{-2}$, A6 = $-0.40373 \times 10^{-2}$, A8 = $0.12631 \times 10^{-2}$, A10 = $-0.33070 \times 10^{-3}$
Aspherical Surface Data of Surface r5
$\epsilon = 0.10000 \times 10$, A4 = $0.77193 \times 10^{-1}$, A6 = $-0.39785$, A8 = $0.14503 \times 10$, A10 = $-0.19088 \times 10$

TABLE 9

Actual Values of Conditional Formulae

| Example | Conditional Formula (1) t1/Y' | Conditional Formula (2) \|f1/fw\| | Conditional Formula (3) f21/fw | Conditional Formula (4) f22/fw | Conditional Formula (5) f22/ft | Conditional Formula (6) f21/ft |
|---|---|---|---|---|---|---|
| 1 | 0.70 | 2.12 | 1.61 | 3.86 | 2.04 | 0.85 |
| 2 | 0.61 | 1.89 | 25.38 | 1.11 | 0.59 | 13.36 |
| 3 | 0.61 | 2.38 | 14.26 | 1.12 | 0.59 | 7.51 |
| 4 | 0.92 | 3.42 | 10.69 | 1.38 | 0.58 | 4.49 |
| 5 | 0.61 | 2.97 | 0.66 | −0.65 | −0.34 | 0.35 |
| 6 | 0.69 | 2.34 | 4.33 | 2.24 | 0.78 | 1.50 |
| 7 | 1.23 | 3.19 | — | — | — | — |
| 8 | 0.76 | 3.94 | — | — | — | — |

What is claimed is:

1. A taking lens device comprising:
 a zoom lens system, comprising a plurality of lens units, for forming an optical image of an object with variable magnification achieved by varying distances between the lens units; and
 an image sensor for converting the optical image formed by the zoom lens system into an electric signal,
 wherein the zoom lens system comprises, from an object side to an image side:
  a first lens unit having a negative optical power and composed solely of a single negative lens element having a sharper curvature on an image side than on an object side thereof, the first lens unit being moved along an optical axis during zooming; and
  a second lens unit disposed with an aerial distance secured between itself and the first lens unit and having a positive optical power, the second lens unit being moved along the optical axis during zooming,
 wherein the following conditional formulae (1) and (2) are fulfilled:

$$0.3 < t1/Y' < 1.5 \tag{1}$$

$$1.4 < |f1/fw| < 5 \tag{2}$$

where
 t1 represents an axial thickness (surface-to-surface distance along the optical axis) of the negative lens element constituting the first lens unit;
 Y' represents a maximum image height shootable;
 f1 represents a focal length of the first lens unit; and
 fw represents a focal length of the entire zoom lens system at a wide-angle end.

2. A taking lens device as claimed in claim 1, wherein the second lens unit comprises two lens elements, namely, from an object side, one positive lens element convex to the object side and one biconvex lens element.

3. A taking lens device as claimed in claim 1, wherein the second lens unit comprises two positive lens elements, and the following conditional formulae (3) and (4) are fulfilled:

$$1 < f21/fw < 50 \tag{3}$$

$$0.5 < f22/fw < 5 \tag{4}$$

where
 f21 represents a focal length of the object-side lens element of the second lens unit;

f22 represents a focal length of the image-side lens element of the second lens unit; and fw represents a focal length of the entire zoom lens system at a wide-angle end.

4. A taking lens device as claimed in claim 1, further comprising:

an optical low-pass filter disposed in the optical path between the zoom lens system and the image sensor.

5. A taking lens device comprising:

a zoom lens system, comprising a plurality of lens units, for forming an optical image of an object with variable magnification achieved by varying distances between the lens units; and an image sensor for converting the optical image formed by the zoom lens system into an electric signal, wherein the zoom lens system comprises, from an object side to an image side:

a first lens unit having a negative optical power and composed solely of a single negative lens element having a sharper curvature on an image side than on an object side thereof, the first lens unit being moved along an optical axis during zooming; and a second lens unit disposed with an aerial distance secured between itself and the first lens unit and having a positive optical power, the second lens unit comprising two lens elements, namely, from an object side, one positive lens element and one positive or negative lens element, the second lens unit being moved along the optical axis during zooming.

6. A taking lens device as claimed in claim 5, wherein the zoom lens system is composed solely of two lens units, namely the first and second lens units.

7. A taking lens device as claimed in claim 5, wherein the second lens unit comprises two lens elements, namely, from an object side, one positive lens element convex to the object side and one biconvex lens element.

8. A taking lens device as claimed in claim 5, wherein the following conditional formulae (1) and (2) are fulfilled:

$$0.3 < t1/Y' < 1.5 \quad (1)$$

$$1.4 < |f1/fw| < 5 \quad (2)$$

where t1 represents an axial thickness (surface-to-surface distance along the optical axis) of the negative lens element constituting the first lens unit;

Y' represents a maximum image height shootable;

f1 represents a focal length of the first lens unit; and fw represents a focal length of the entire zoom lens system at a wide-angle end.

9. A taking lens device as claimed in claim 5, wherein the following conditional formulae (3) and (4) are fulfilled:

$$1 < f21/fw < 50 \quad (3)$$

$$0.5 < f22/fw < 5 \quad (4)$$

where f21 represents a focal length of the object-side lens element of the second lens unit;

f22 represents a focal length of the image-side lens element of the second lens unit; and fw represents a focal length of the entire zoom lens system at a wide-angle end.

10. A taking lens device as claimed in claim 5, further comprising:

an optical low-pass filter disposed in the optical path between the zoom lens system and the image sensor.

11. A taking lens device comprising:

a zoom lens system, comprising a plurality of lens units, for forming an optical image of an object with variable magnification achieved by varying distances between the lens units; and an image sensor for converting the optical image formed by the zoom lens system into an electric signal, wherein the zoom lens system comprises, from an object side to an image side:

a first lens unit having a negative optical power and composed solely of a single negative lens element made of resin and having a sharper curvature on an image side than on an object side thereof, the first lens unit being moved along an optical axis during zooming; and a second lens unit disposed with an aerial distance secured between itself and the first lens unit and having a positive optical power, the second lens unit having a lens element made of resin at an image-side end thereof, the second lens unit being moved along the optical axis during zooming.

12. A taking lens device as claimed in claim 11, wherein the zoom lens system is composed solely of two lens units, namely the first and second lens units.

13. A taking lens device as claimed in claim 11, wherein the second lens unit comprises two lens elements.

14. A taking lens device as claimed in claim 13, wherein the following conditional formula (5) is fulfilled:

$$0.3 < f22/ft < 2 \quad (5)$$

where f22 represents a focal length of the image-side lens element of the second lens unit; and ft represents a focal length of the entire zoom lens system at a telephoto end.

15. A taking lens device as claimed in claim 13, wherein the following conditional formula (6) is fulfilled:

$$0.5 < f21/ft < 20 \quad (6)$$

where f21 represents a focal length of the object-side lens element of the second lens unit; and ft represents a focal length of the entire zoom lens system at a telephoto end.

16. A taking lens device as claimed in claim 11, further comprising:

an optical low-pass filter disposed in the optical path between the zoom lens system and the image sensor.

17. A taking lens device comprising:

a zoom lens system, comprising a plurality of lens units, for forming an optical image of an object with variable magnification achieved by varying distances between the lens units; and an image sensor for converting the optical image formed by the zoom lens system into an electric signal, wherein the zoom lens system comprises, from an object side to an image side:

a first lens unit having a negative optical power and composed solely of a single negative lens element having a sharper curvature on an image side than on an object side thereof, the first lens unit being moved along an optical axis during zooming; and a second lens unit disposed with an aerial distance secured between itself and the first lens unit, having a positive optical power, and composed solely of a single positive lens element having a sharper curvature on an object side than on an image side thereof, the second lens unit being moved along the optical axis during zooming.

18. A taking lens device as claimed in claim 17, wherein the zoom lens system is composed solely of two lens units, namely the first and second lens units.

19. A taking lens device as claimed in claim 17, wherein the following conditional formula (2) is fulfilled:

$$1.4 < |f1/fw| < 5 \qquad (2)$$

where

- f1 represents a focal length of the first lens unit; and
- fw represents a focal length of the entire zoom lens system at a wide-angle end.

20. A taking lens device as claimed in claim 17, wherein the lens element constituting the first lens unit is made of glass.

21. A taking lens device as claimed in claim 17, wherein the lens element constituting the first lens unit is made of resin.

22. A taking lens device as claimed in claim 21, wherein the lens element constituting the second lens unit is made of resin.

23. A taking lens device as claimed in claim 17, further comprising:

an optical low-pass filter disposed in the optical path between the zoom lens system and the image sensor.

* * * * *

UNITED STATES PATENT AND TRADEMARK OFFICE
CERTIFICATE OF CORRECTION

PATENT NO. : 6,515,805 B2
DATED : February 4, 2003
INVENTOR(S) : Hitoshi Hagimori It is certified that error appears in the above-identified patent and that said Letters Patent is hereby corrected as shown below:

Column 12,
Line 65, under the heading "Radius of Curvature" delete "$r5^*= \infty(ST)$", and insert -- $r5= \infty(ST)$ --.

Column 13,
Lines 9 and 36, under the heading "Radius of Curvature", delete "$r7=$", and insert -- $r7^*=$ --.
Line 48, under the heading "Aspherical Surface Data of Surface r7", delete "$\varepsilon= 0.10781 \times 10$," and insert -- $\varepsilon= -0.10781 \times 10$, --.

Column 14,
Line 28, under the heading "Axial Distance", delete "$d2=\sim5.712\sim2.892\sim1.418$", and insert -- $d2= 5.712\sim2.892\sim1.418$ --.
Line 32, under the heading "Radius of Curvature", delete "$r6=$", and insert -- $r6^*=$ --.
Lines 40 and 41, under the heading "Aspherical Surface Data of Surface r4", delete "$A8=0.11403 \times 10^{-1}, A10 = 0.31980 \times 10^{-3}$", and insert -- $A8=0.11403 \times 10^{-3}$ --.
Line 43, under the heading "Aspherical Surface Data of Surface r6", delete "$A6 =0.15475$," and insert -- $A6 =0.15475 \times 10^{-1}$, --.
Line 55, under the heading "Aspherical Surface Date of Surface r6", delete "$A6 =0.15475$," and insert -- $A6 =0.15475 \times 10^{-1}$ --.
Line 57, under the heading "Radius of Curvature", delete "$r7=$", and insert -- $r7^*=$ --.

Column 15,
Line 14, under the heading "Aspherical Surface Data of Surface r7", delete "$A10 \times 0.11075$", and insert -- $A10=0.11075$ --.
Lines 37 and 38, under the heading "Aspherical Surface Data of Surface r2", delete "$A8= 0.11447 \times 10^{-2}$," and insert -- $A8= -0.11447 \times 10^{-2}$, --.

UNITED STATES PATENT AND TRADEMARK OFFICE
CERTIFICATE OF CORRECTION

PATENT NO.    : 6,515,805 B2
DATED         : February 4, 2003
INVENTOR(S)   : Hitoshi Hagimori It is certified that error appears in the above-identified patent and that said Letters Patent is hereby corrected as shown below:

<u>Column 15 (cont'd),</u>
Line 52, under the heading "Axial Distance", delete "d2=~ 0.798~3.063~0.700", and insert -- d2=10.798 ~ 3.063~ 0.700 --.

Signed and Sealed this

Eleventh Day of May, 2004

JON W. DUDAS
*Acting Director of the United States Patent and Trademark Office*